United States Patent [19]

Lemon et al.

[11] Patent Number: 5,340,888

[45] Date of Patent: Aug. 23, 1994

[54] PHENOLIC RESIN COMPOSITION

[75] Inventors: Peter H. R. B. Lemon, Romsey; James G. King, Southampton, both of England; Graham Murray, Edinburgh, Scotland; Henry Leoni, Southampton, England; Arthur H. Gerber, Louisville, Ky.

[73] Assignee: Borden Inc., Columbus, Ohio

[21] Appl. No.: 29,304

[22] Filed: Mar. 8, 1993

Related U.S. Application Data

[63] Continuation of Ser. No. 837,701, Feb. 19, 1992, abandoned, which is a continuation of Ser. No. 451,052, Dec. 15, 1989, abandoned.

[30] Foreign Application Priority Data

Dec. 22, 1988 [GB] United Kingdom ............... 8829984
Aug. 11, 1989 [GB] United Kingdom ............... 8918385

[51] Int. Cl.$^5$ ..................... C08L 61/06; C08L 61/14
[52] U.S. Cl. ................... 525/501; 525/502; 525/508; 525/924
[58] Field of Search .............. 525/924, 501, 502, 508

[56] References Cited

U.S. PATENT DOCUMENTS

Re. 32,720  7/1988  Lemon et al. ................. 523/145

(List continued on next page.)

FOREIGN PATENT DOCUMENTS

| 0086615 | 8/1983 | European Pat. Off. . |
| 0085512 | 3/1985 | European Pat. Off. . |
| 0189258 | 7/1986 | European Pat. Off. . |
| 474561 | 3/1929 | Fed. Rep. of Germany . |
| 1065605 | 9/1959 | Fed. Rep. of Germany . |
| 1171606 | 6/1964 | Fed. Rep. of Germany . |
| 526968 | 7/1921 | France . |
| 49-16793 | 2/1974 | Japan . |
| 50-130627 | 10/1975 | Japan . |
| 62-040948 | 8/1985 | Japan . |
| 62-282743 | 12/1987 | Japan . |
| 63-40636 | 2/1988 | Japan . |
| 1210239 | 10/1970 | United Kingdom . |
| 1391420 | 4/1975 | United Kingdom . |
| 2059972 | 4/1981 | United Kingdom . |
| 2140017 | 11/1986 | United Kingdom . |

OTHER PUBLICATIONS

*Introduction to Organic Chemistry*, 2nd ed. Streitwieser & Clayton, p. 1002.

"Condensation of Phenols with Amines and Formaldehyde", Bruson and MacMullen; Journal of the American Chemical Society, 5/41, p. 270–272.

"Proton Magnetic Resonance Study on the Structure of Phenol–Formaldehyde Resins", Woodbrey, Higginbottom and Culbertson; Journal of Polymer Science, Part A, vol. 3, pp. 1079–1106 (1965).

*Primary Examiner*—James J. Seidleck
*Assistant Examiner*—W. Robinson H. Clark
*Attorney, Agent, or Firm*—Venable, Baetjer Howard & Civiletti

[57] ABSTRACT

The present invention is directed to a phenolic resin composition suitable for use in bonding refractory materials, such as sand, in the production of foundry moulds and cores and also in treating subterranean formations. The phenolic resin composition comprises an esterified phenolic compound, a phenolic novolak resin and a base, which will react to provide final cure in the presence of water or other polar solvent. The composition, once reacted, will bond granular refractory materials. The esterified phenolic compound contains at least one esterified methylol group positioned ortho or para to a phenolic hydroxyl group or an esterified phenolic hydroxyl group. Included within the invention are anhydrous precursors to the reactive phenolic resin composition and also foundry moulding compositions which incorporate the reactive phenolic resin compositions. Other embodiments of the invention include methods for making foundry moulds and cores and methods for curing the reactive phenolic resin composition.

64 Claims, No Drawings

U.S. PATENT DOCUMENTS

| | | | |
|---|---|---|---|
| Re. 32,812 | 12/1988 | Lemon et al. | 523/145 |
| 2,007,968 | 7/1935 | Graves | 260/4 |
| 2,091,965 | 9/1937 | Cherry | 260/4 |
| 2,124,285 | 7/1938 | Bucherer | 260/4 |
| 2,134,388 | 10/1938 | Cherry | 260/479 |
| 2,541,471 | 2/1951 | Hull et al. | 23/277 |
| 2,544,365 | 3/1951 | Sorenson | 260/19 |
| 2,581,390 | 1/1952 | De Groote | 525/502 |
| 3,248,276 | 4/1966 | Bean, Jr. et al. | 525/502 |
| 3,259,469 | 7/1966 | Painter et al. | 23/277 |
| 3,283,030 | 11/1966 | Bean, Jr. et al. | 525/502 |
| 3,458,477 | 7/1969 | Ford, Jr. et al. | 525/502 |
| 3,558,560 | 1/1971 | Huck et al. | 266/59 |
| 3,705,862 | 12/1972 | Stieger et al. | 525/502 |
| 3,800,005 | 3/1974 | Sherwood et al. | 525/502 |
| 3,867,323 | 2/1975 | Rifi | 525/501.5 |
| 3,905,934 | 9/1975 | Gardikes | 260/31.8 T |
| 4,111,253 | 9/1978 | Epstein et al. | 524/598 |
| 4,252,700 | 2/1981 | Funabiki et al. | 525/501 |
| 4,317,896 | 3/1982 | Holik | 525/501 |
| 4,395,521 | 7/1983 | Chow et al. | 525/502 |
| 4,424,300 | 1/1984 | Udvardy et al. | 525/501 |
| 4,426,467 | 1/1984 | Quist et al. | 523/145 |
| 4,460,717 | 7/1984 | Saeki et al. | 524/259 |
| 4,468,359 | 8/1984 | Lemon et al. | 264/82 |
| 4,474,904 | 10/1984 | Lemon et al. | 523/146 |
| 4,501,836 | 2/1985 | Nakamura et al. | 524/66 |
| 4,539,338 | 9/1985 | Carlson et al. | 521/131 |
| 4,831,067 | 5/1989 | Lemon et al. | 524/435 |
| 4,994,505 | 2/1991 | Gerber | 525/501 |
| 5,051,454 | 9/1991 | Lemon et al. | 532/146 |

PHENOLIC RESIN COMPOSITION

This application is a continuation of application Ser. No. 837,701, filed Feb. 19, 1992, now abandoned, which is a continuation of application Ser. No. 451,052, filed Dec. 15, 1989, now abandoned.

This invention relates to phenolic resins. More particularly, it relates to a method of making phenolic resin compositions based on phenolic novolak resins and esterified methylolated phenolic compounds.

It is known that alkaline phenolic resins may be cured under alkaline conditions through reaction with organic esters, including lactones and organic carbonates. Such curing of alkaline phenolic resole resins is described, inter alia, in DE-C-1,065,605, DE-C-1,171,606, JP-A-49-16793, JP-A-50-130627, GB-A-2059975, EP-A-0085512 and EP-A-0086615. According to these publications, a highly alkaline phenolic resole resin in aqueous solution may be cured at ambient temperature by reaction with an organic ester (including lactones and carbonates) by contacting the resin with the ester in the form of a liquid or a gas.

Such resins find application particularly in the bonding of refractory materials, such as sand, in the production of foundry moulds and cores and in treating subterranean formations. Other applications of the resins, such as in wood bonding, have also been proposed.

The setting of highly alkaline phenolic resins (resole resins) with esters involves the saponification of the ester, but it is a disadvantage with the products heretofore produced that some products of the saponification reaction are not incorporated into the final resin structure but remain in the cured mass as non-resinous compounds, in the form of free alcohol and in the form of the salt of the acid component of the ester.

In an attempt to remedy at least part of this deficiency, it has been proposed, for example, in GB-A-2,140,017, to employ a formate or acetate ester of a mono- or polyhydric phenol reactive with formaldehyde as the ester component for hardening alkaline phenolic resole resins. In this case, the ester is obtained by esterifying the phenolic —OH group(s) of the mono- or polyhydric phenol. When the ester is saponified as a consequence of the action of the alkali in the resin component, the original phenol which formed the alcohol component of the ester is released and is capable of reacting into the resin structure. Since the phenol is reactive with formaldehyde, it also serves to bind any formaldehyde which is uncombined in the resin or is liberated subsequently.

It is a further characteristic of the ester cured phenolic resin systems heretofore produced that they are effective only when a strong alkali is employed and, in practice, only sodium or potassium hydroxide produce satisfactory compositions. Phenolic resins produced with weaker bases either cannot be set using esters, or can be set only by additionally heating to high temperatures.

We have now found that these and other disadvantages can be avoided or, at least, substantially reduced by preparing a phenolic resin composition from a reaction mixture comprising a phenolic novolak resin and a phenolic compound containing esterified methylol phenolic ring substituent(s) in the presence of an alkaline substance and water and/or other polar solvent.

The present invention provides a phenolic resin composition comprising (1) an esterified phenolic compound containing one or more phenolic hydroxyl groups and/or one or more esterified phenolic hydroxyl groups and containing one or more esterified methylol groups positioned ortho and/or para to a phenolic hydroxyl group or esterified phenolic hydroxyl group, (2) a phenolic novolak resin, and (3) a base, in the presence of water and/or other polar solvent.

The present invention also provides a method of making a cured phenolic resin composition comprising reacting together (1) an esterified phenolic compound containing one or more phenolic hydroxyl groups and/or one or more esterified phenolic hydroxyl groups and containing one or more esterified methylol groups positioned ortho and/or para to a phenolic hydroxyl group or esterified phenolic hydroxyl group, (2) a phenolic novolak resin, and (3) a base, in the presence of water and/or other polar solvent.

The phenolic novolak resin and the esterified phenolic compound used in the present invention are considerably more reactive when mixed together in the presence of a base and water and/or other polar solvent than the prior art alkaline phenolic resole/organic ester systems. Although the composition of the present invention is useful in the production of phenolic foams and as a rock bolt grouting system, it is especially useful as a binder for sand or other granular refractory materials in the production of foundry moulds and cores. When the phenolic resin composition of the present invention is employed as a binder in the production of foundry moulds and cores, it sets in a short time at room temperature on mixing to provide products of high strength. Thus, according to a preferred embodiment of the invention, there is provided a foundry moulding composition comprising a mixture of a major proportion of a granular refractory material and a minor proportion of a phenolic resin composition which comprises (1) an esterified phenolic compound containing one or more phenolic hydroxy groups and/or one or more esterified phenolic hydroxyl groups and containing one or more esterified methylol groups positioned ortho and/or para to a phenolic hydroxyl group or esterified phenolic hydroxyl group, (2) a phenolic novolak resin, and (3) a base, and (4) water and/or other polar solvent.

The terms "phenolic resole resin" and "phenolic novolak resin" are, of course, terms of the phenolic resin art. Resoles are thermosetting, i.e. they form an infusible three-dimensional polymer upon the application of heat, and are formed by condensing a phenol with a molar excess of aldehyde in the presence of a basic catalyst. Phenol-aldehyde novolak resins, on the other hand, are phenol ended chain polymers formed by the reaction of an aldehyde with a molar excess of a phenol typically in the presence of an acidic catalyst. These novolak resins are permanently fusible non-curing resins which are conventionally cured into an insoluble, infusible resin by reaction with a curing agent such as hexamethylenetetramine at elevated temperature.

The esterified phenolic compound used in the present invention is a phenol or a phenol derivative containing one or more phenolic hydroxyl groups and/or one or more esterified phenolic hydroxyl groups and one or more esterified methylol groups attached to a phenolic ring carbon atom at a position ortho and/or para to at least one phenolic hydroxyl group or esterified phenolic hydroxyl group. Thus, it will be understood that the esterified phenolic compound used may be a mono-, a di- or a polyesterified methylolated mono-, di- or polynuclear phenol wherein at least one esterified methylol group is attached to an aromatic ring carbon atom ortho or para to a phenolic hydroxyl group or esterified phenolic hydroxyl group.

By the term "mononuclear phenol", we mean a nonpolymeric compound having an aromatic nucleus to which is directly attached at least one hydroxyl group. Examples of mononuclear phenols include, but are not restricted to, phenol itself, homologues of phenol such as o-, m- or p-cresol, 3,5-xylen-1-ol and o- or p-phenylphenol and derivatives of phenol such as resorcinol, phloroglucinol, pyrogallol. 4,4'-dihydroxydiphenyl, 4,4'-dihydroxydiphenyl ether and 4,4'-dihydroxydiphenyl thioether. By the terms "dinuclear phenol" and "polynuclear phenol" we mean compounds formed by the condensation reaction of two or more molecules of a mononuclear phenol with one or more molecules of a phenol-reactive aldehyde or ketone. Examples include, but are not limited to, resinous reaction products of phenol, homologues of phenol or derivatives thereof (for example, o-, m- or p-cresol, 3,5-xylen-1-ol, ethyl phenol, o- or p-phenylphenol, resorcinol, phloroglucinol, pyrogallol and Bisphenol A) 4,4'-dihydroxydiphenyl, 4,4'-dihydroxydiphenyl ether and 4,4'-(dihydroxydiphenyl thioether) with an aldehyde (such as formaldehyde, acetaldehyde, furfuraldehyde benzaldehyde and mixtures thereof) or with a ketone (such as acetone and cyclohexanone). Furthermore, mixtures of aldehyde-reactive phenols, such as mixed cresol isomers, xylenols and phenolic blends such as those obtained from coal tar fractionation and cashew nut shell liquid, can be employed as all or part of the phenol component.

It is especially preferred in the present invention that the esterified phenolic compound contains no free phenolic hydroxyl groups but only one or more esterified phenolic hydroxyl groups in addition to the one or more esterified methylol groups positioned ortho and/or para to the esterified phenolic hydroxyl group(s). This is because in such a case the esterified phenolic compound will be stable on storage, even at relatively high ambient temperatures. In contrast, the alkaline solutions of phenolic resole resins hitherto employed have limited storage lives because the condensation reaction which proceeds, albeit slowly, during storage results in a progressive change in the properties of the resole resin, ending with gelation. Also storage stable is the phenolic novolak resin in aqueous alkaline solution and, therefore, it is a particular advantage of this embodiment of the invention that the reactive components of the phenolic resin binder composition can be stored, prior to being mixed together, as two separate stable compositions: one comprising the esterified phenolic compound containing no free phenolic hydroxyl group optionally dissolved in water and/or another polar solvent, the other being an aqueous alkaline solution of the phenolic novolak resin.

As mentioned above, the esterified phenolic compounds which have use according to the present invention in the production of phenolic resin compositions, contain one or more esterified methylol groups located ortho and/or para to a phenolic hydroxyl group or esterified phenolic hydroxyl group. By the term "esterified methylol group" as used herein, we mean an organocarbonyloxymethylene or substituted derivative thereof. By the term "methylol group" we mean a group of the general formula.

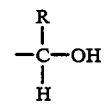

wherein R is H, an aliphatic or aromatic hydrocarbyl or an heterocyclic group. Typically, the phenolic compounds having use in the various aspects and embodiments of the present invention may be prepared from an appropriate methylol-containing phenol or phenol derivative by reacting the same with an esterifying reagent. The methylol-containing phenol or phenol derivative may be produced by reacting formaldehyde, or other aldehyde such as acetaldehyde, butyraldehyde, and furfuraldehyde, with the appropriate phenol or derivative thereof.

For reasons of availability and reasonable cost, coupled with repeatability and freedom from strong or offensive odors, the preferred type of phenolic compound is one based on a condensation product of phenol and formaldehyde. Such condensation products may be manufactured in known ways by reacting phenol and formaldehyde in the presence of acid or basic catalysts, although the production of such products does not form part of this invention. Where basic catalysts are employed for this purpose, the resultant phenol-formaldehyde condensation products will possess free methylol groups in a proportion which will depend primarily upon the ratio of formaldehyde to phenol. These groups are attached to phenolic ring carbon atoms ortho and/or para to the phenolic hydroxyl groups. However, where acid catalysts are employed, the resultant phenol-formaldehyde condensation products do not normally contain methylol groups if the ratio of formaldehyde to phenol is less than 1.0. Such products may form suitable starting materials, however, if a methylolation step, using formaldehyde under neutral or alkaline conditions, is carried out subsequent to the manufacture of the acid catalyzed condensation product and prior to esterification.

Similarly, where the phenolic compound is a condensation reaction product of a phenol and a phenol-reactive ketone, methylolation will be necessary prior to esterification. Such methylolation can be readily carried out by reaction with formaldehyde under neutral or alkaline conditions in the manner described above.

Of these various methods of preparing the methylol-containing phenol or phenol derivative, we prefer to prepare a phenol-formaldehyde condensation product in the presence of a basic catalyst (i.e. a resole resin) since such avoids the need for a further methylolation step. In such a condensation product, the mole ratio of phenol:formaldehyde will typically be in the range of from 1:1.2 to 1:3.0, preferably from 1:1.5 to 1:3.0. The amount of alkali used as condensation catalyst will typically be about 1–2% by weight based on the weight of the phenol, generally sufficient to maintain a pH of at least 8, but may be considerably higher. The degree of condensation of such a resole resin can conveniently be described by reference to two parameters; the residual solids on heating at 100° C. to constant weight and the viscosity of the resole solution. The resole resins most preferably used as the methylol-containing phenolic derivatives to be esterified to produce the esterified phenolic compounds will have a solids content of from 30 to 95%, preferably 50 to 75%, by weight and a viscosity of from 0.1 to 100 poise, preferably 1 to 25 poise, at 25° C. Typical examples of condensation catalysts include the oxides and hydroxides of sodium, potassium, lithium, barium, calcium, magnesium and amines and ammonia.

The methylol-containing phenol or phenol derivative thus prepared may then be esterified to produce the desired esterified phenolic compound containing one or more esterified methylol groups positioned ortho and-/or para to a phenolic hydroxyl group or esterified phenolic hydroxyl group. The esters of the methylol-containing phenols or phenol derivatives contemplated are organic carboxylate esters. These esters may be derivable from any aliphatic, alicyclic or aromatic mono-, di- or polybasic acid capable of forming esters with methylol groups. It is also possible for an esterified methylol-containing phenolic compound to contain ester groups derived from more than one of these acids. For most purposes, however, the esters will be those formed from lower carboxylic acids, especially formic acid and acetic acid. Where reference herein is made to the acid component of the ester group, this is intended only as descriptive of the type of group and it is not intended to indicate that the acid itself need be employed for the manufacture of the methylol ester. In fact, the ester may be formed in any known way and the procedure adopted may be varied, as will be known to those skilled in the art, to suit the particular compounds being produced. Examples of some methods of esterification that may be used include:

(1) reaction of methylol compound with acid anhydride, mixed anhydride or acid chloride, typically in the presence of a suitable catalyst;

(2) ester exchange between a methylol compound and a suitable carboxylic acid ester in the presence of a suitable catalyst or by acid interchange as described, for example, in U.S. Pat. No. 2,544,365; and (3) treatment of a methylol compound with ketene, diketene or their derivatives.

It is also possible to produce the desired phenolic compounds by the action of an acid anhydride on mono-, di- or tri-dialkylamino methyl substituted phenols or phenol derivatives.

Generally speaking, methylolated phenols and phenolic resole resins are acid sensitive and in most cases it will be necessary to esterify the methylol groups, and optionally the phenolic hydroxyl groups, on a phenolic resin by an indirect route, so as to avoid gelation of the resin. The tendency to gel may be reduced or eliminated by blocking the phenolic —OH group by esterifying or etherifying it, as described, for example, in DE-C-474,561. Obviously, any catalyst employed to promote the esterification reaction must not be capable of entering into further reaction with the esterification reaction under the reaction conditions used. An example of a suitable esterification catalyst is pyridine.

A preferred procedure is to form the acetate ester of methylol-containing phenolic compounds by introducing ketene into a solution of the methylol-containing phenolic compound. In this case, the ketene is preferably generated immediately prior to use, typically in equipment such as that described in U.S. Pat. Nos. 2,541,471 or 3,259,469. By reacting the phenolic compound with diketene in a similar way, the acetoacetate ester of the phenolic compound is obtained. Other esters may be formed by ester exchange.

Suitable ester groups include, but are not restricted to formate, acetate, acetoacetate, acrylate, propionate, lactate, crotonate, methacrylate, butyrate, isobutyrate, caproate, caprylate, benzoate, toluate, p-amino-benzoate, p-hydroxybenzoate, salicylate, cinnamate, laurate, myristate, palmitate, oleate, ricinoleate, stearate, oxalate, euccinate, fumarate, maleate, adipate, phthalate, azelate and sebacate. Acetate esters form a particularly preferred class of compounds according to the present invention.

One particular class of methylol esters which is particularly useful is that of the methylol hydroxybenzoates since, on saponification of the ester in the presence of a base, the hydroxybenzoate moiety is, by virtue of its phenolic hydroxyl group, capable of linking into the phenolic resin structure and, by virtue of its carboxylate group, capable of attaching any basic metal ion to the fully cross-linked molecule. Thus, on the saponification of hydroxybenzoate esters of methylol-containing phenolic compounds, in the presence of a base, there is no release either of an alcohol component or of a salt unlike the case with prior art ester curing systems for alkaline phenolic resins. Another class having similar capabilities to hydroxybenzoates comprises the hydroxyphenylalkyl-carboxylates which will have the same effect as hydroxybenzoates although hydroxyphenylalkyl carboxylic acids may form esters more easily with methylolated phenolic resins. Examples of the hydroxybenzoate and hydroxyphenylalkyl carboxylate esters include those derivable from the acids 3,5-dihydroxybenzoic acid, 4-hydroxyphenylacetic acid, 2,4,6-trihydroxybenzoic acid, 4-hydroxybenzoic acid, 4,4-bis(4-hydroxyphenyl) valetic acid, gallic acid and salicylic acid.

The list of suitable ester groups mentioned above includes some ester groups derived from acids which are themselves capable of undergoing polymerization (e.g. acrylate and methacrylate). It is, accordingly, possible to use a phenolic compound, as precursor to a cured phenolic resin, which contains methylol esters of such acids. On saponification in the presence of the base, a polymerizable salt is released which can then be made to polymerize to form a high molecular weight material.

As mentioned above, acetate esters form a particularly preferred class of esterified phenolic compounds useful in the present invention. Not only have we achieved some excellent results using some highly acetylated phenol-formaldehyde resole resins as the esterified phenolic compounds but we have also achieved similar, and in some cases superior, results using some acetate esters of certain methylolated mono- and dinuclear compounds. Examples of these include 2,4,6-trimethylolphenol tetraacetate (TMPTA), 2,6-dimethylol-p-cresol triacetate, 2,6-dimethylolphenol triacetate and 2,2',6,6'-tetramethylol-Bisphenol A hexaacetate. Of these materials, TMPTA is preferred.

Because phenol-formaldehyde resoles are so unstable and tend to form higher molecular weight materials by condensation polymerization even at ambient temperatures, conditions for esterification are very critical. Therefore, as will be understood from the above, the reaction conditions conventionally employed in the preparation of esters from carboxylic acids and stable alcohols, such as methyl and ethyl alcohols, will not always be suitable in the esterification of the methylol groups attached to aromatic nuclei in phenolformaldehyde resole resins. Furthermore, the presence of a carboxylic acid may, itself, cause polymerization of low molecular weight phenol alcohols present in a resole composition. Thus it is preferred to add the acid slowly to the resole, so that only mildly acid conditions prevail during the esterification reaction.

Solvents, such as, ethers or ketones, may conveniently be used, particularly in the case of higher molecular weight resoles, to dissolve the resole and facilitate uniform reaction.

Since the esterification reaction evolves water, it may be accelerated by the use of non-aqueous conditions, as well as by the use of a low-boiling solvent capable of forming an azeotrope with water.

The esters of the present invention may typically be prepared by choosing conditions which preferentially esterify the —CH$_2$OH group and not the phenolic —OH group. However, as it is clear from the above and according to one preferred embodiment, the esterified phenolic compound may be one in which all of the phenolic hydroxyl groups themselves are esterified. These components will generally be slower to react but will exhibit greater storage stability because of the inactivation of the phenolic —OH group.

Generally, when an acid is used to esterify the phenolic compound, the preferred amount of acid used will be equal, on a molar basis, to the content of free methylol groups. However, in cases where a plurality of methylol groups is present, it is possible to esterify only a proportion of the methylol groups, so that the remaining unesterified methylol groups allow the product to be thermally polymerized at a later stage. This could, for example, be a convenient means of retaining a degree of thermoplasticity in the product.

On the other hand, an excess of acid may be required to induce esterification at low temperature. Ideally, any residual free acid should be removed from esterified methylol-containing phenolic compound before the latter is reacted with the phenolic novolak resin in the presence of a base and water or other polar solvent to produce a phenolic resin composition since any residual free acid present in the esterified phenolic compound will neutralize the base.

The esterified phenolic compound will be used in the performance of the present invention in an amount typically from 10–120% by weight based on the weight of the phenolic novolak resin. Preferably, the amount of esterified phenolic compound used will be from 20 to 60% by weight of the phenolic novolak resin.

The phenolic novolak resin may be made in any of the known ways. In order to obtain a resin having the properties of a novolak, that is to say, in order to obtain a product which does not thermoset upon heating, it is necessary to react the phenol and the aldehyde in a molar ratio of less than 1 mole of aldehyde to each mole of the phenol.

The phenol used is preferably phenol itself or m-cresol or a mixture of phenol and a m-cresol. Other phenols or homologues that may be used to form all or part of the phenol component in the novolak resin include 3,5-xylene-1-ol, ethyl phenol, resorcinol, phloroglucinol, pyrogallol, mixtures of aldehyde-reactive phenols, such as mixed cresol isomers and xylenols and phenolic blends, such as those obtained from coal tar fractionation, and cashew nut shell liquid.

The aldehyde used to make the phenolic novolak resin may be, for example, formaldehyde, which is preferably used in the form of its aqueous solution, paraformaldehyde, acetaldehyde, furfuraldehyde or benzaldehyde. The phenolic novolak resin may also be prepared by reacting a phenol, as described above, with a ketone, such as acetone, cyclohexanone or mixtures thereof. For reasons of availability and reasonable cost, coupled with repeatability and freedom from strong or offensive odors, the preferred type of phenolic novolak is a condensation product of phenol and formaldehyde.

The novolak resin may be prepared using any of the catalysts commonly employed for this purpose. Suitable acid catalysts include the strong mineral acids, such as sulphuric, phosphoric and hydrochloric acids, and organic acids, such as oxalic and salicylic acids or anhydrides, such as maleic anhydride.

As stated above, the phenol and the aldehyde are reacted together in a molar ratio of less than 1 mole of aldehyde to each mole of the phenol. In general, the aldehyde will not be used in a molar ratio to phenol of less than 0.2:1. Preferably, however, the aldehyde used is formaldehyde and typically the molar ratio of formaldehyde to phenol will be within the range of from 0.2:1 to 0.85:1 since amounts of formaldehyde in excess of this maximum involve an increased risk of premature gelation of the resin and amounts below 0.2 mole per mole of phenol are uneconomic because of the increased level of phenol that would remain unreacted. In order to obtain a good compromise of properties we prefer to use a formaldehyde to phenol molar ratio in the range of from 0.4:1 to 0.7:1.

In the case of an acid-catalyzed novolak resin, it is only necessary to employ sufficient of the acidic material to obtain a satisfactory rate of resinification and the proportion required will vary with the type of acid used. In the case of the strong mineral acids, such as sulphuric acid or hydrochloric acid, this will generally be in the range of from 0.02 to 1.0%, and preferably from 0.1 to 0.6%, by weight based on the weight of the phenol employed. With organic acids, such as oxalic acid or maleic anhydride, it is typical to use amounts in the range of from 0.1 and 10%, and preferably from 1 to 5%, by weight based on the weight of the phenol employed.

Methods for the preparation of acid-catalyzed novolak resins are well known and are described, for example, in GB 1,210,239 and in GB 1,391,420.

The novolak resins formed are preferably treated, when the reaction is substantially complete, to remove unreacted phenol. This is because we have found that free phenol in the novolak resin appears to inhibit the crosslinking mechanism that takes place when the esterified phenolic compound reacts with the novolak resin in the presence of a base and, therefore, causes a loss of core strength in the product. Removal of free phenol may most conveniently be accomplished by steam distillation, but other methods of removing unreacted phenol, such as precipitation of the resin from solution and washing of the precipitate prior to drying, may be employed. It will be clear that many benefits of the invention will not be achieved in full measure if substantial amounts of free phenol are left in the resin. On the other hand, it is generally uneconomic and impractical to remove all traces of free phenol from the resin. We have found, however, that a substantial improvement in strength is achieved if the free phenol content of the novolak resin is reduced to less than 2% and, most preferably, to less than 1%.

The reactivity of the phenolic novolak resin component of the composition of the invention is dependent upon its molecular weight and also on the type of base used.

As meritioned above, the esterilied phenolic compounds react with the phenolic novolak resin in the presence of a base, water or other polar solvent. Examples of polar solvents that can be used in the present invention instead of water include methanol, ethanol, industrial methylated spirits (IMS), formamide, N,N-dimethylformamide, dimethylacetamide, triethanolamine, and glycerol.

In the application of the present invention to the production of foundry cores and moulds, we have found that the strength of sand cores is improved if part or all of the polar solvent used is a glycol, such as ethylene glycol or diethylene glycol, an ether alcohol, such as methoxyethanol, ethoxyethanol, phenoxyethanol or ethyl digol (i.e. ethyl ether of diethylene glycol), or a keto alcohol such as diacetone alcohol. Typical total solvent additions are in the range of from 1 to 50% by weight based on the weight of the phenolic novolak resin, and are preferably in the range of from 1 to 30%.

The base used in the present invention may be any material or mixture of materials, which, when added in a suitable amount to the composition comprising an esterified phenolic compound containing one or more esterified methylol groups, renders the composition alkaline which, in the case of aqueous systems, means that the base is one that is capable of raising the pH of the composition to a value above 7. The amount of base required to achieve this desired alkalinity in the composition largely depends on the identity of the base used and on whether the composition to which the base is added contains any chemical species which are reactive towards the base.

For instance, if the esterified phenolic compound contains any base-reactive chemical groups and/or if the composition containing the esterified phenolic compound additionally contains any base-reactive compounds which groups or compounds would have the effect of neutralizing the base when added, then obviously the base should be used in an amount which is in excess of the amount required to neutralize any such base-reactive chemical groups and/or such base-reactive compounds present. Most inorganic bases and many organic amines are suitable for reacting with the esterified phenolic compounds. The ease with which they saponify the resole esters determines the rate of gelation and the minimum temperature at which gelation occurs.

The base, used to saponify the esterified methylol-containing phenolic compound to form a phenolic resin composition according to the invention may take the form of a gas, a low boiling point liquid or the vapor thereof, a liquid material or a solution of an alkali or a solid. Suitable materials include:

(i) 4 oxides and hydroxides of alkali and alkaline earth metals, for example, sodium, potassium, lithium, barium, calcium and magnesium;

(ii) oxides and hydroxides of other metals which exhibit alkaline or amphoteric properties, such as zinc oxide; and (iii) ammonia, quaternary ammonium hydroxides, aliphatic, alicyclic or aromatic secondary and tertiary amines and Mannich bases, for example, dimethylamine, trimethylamine, triethylamine, N,N-dimethylethylamine, diethylenetriamine, triethylenetetramine 2,4-bis(-dimethylaminomethyl) phenol and 2,4,6-tris(dimethylaminomethyl) phenol.

conventionally, novolak resins are cured by heating with hexamethylene tetramine at temperatures above 100° C. Because of the modern emphasis on energy saving, acceleration of heat curing and causing gelation at room temperature are important properties of the materials of the present invention.

The rate of reaction between the esterified phenolic compound and the phenolic novolak resin in the presence of the base is affected, inter alia, by the solubility and by the functionality of the base and, where the base is an inorganic alkaline material, by the position of the cation in the electrochemical series. According to our findings, the rate of reaction between the base and the esterified methylol containing phenolic compound when the base is a secondary amine is lower than when the base is tertiary amine which in turn is lower than when the base is an alkali or alkaline earth metal oxide or hydroxide. We have found that an alkali or an alkaline earth metal oxide or hydroxide can cause a rapid reaction to take place between the esterified phenolic compound and the phenolic novolak resin at ambient temperatures. In our experience, sodium hydroxide tends to give a slower reaction than potassium hydroxide and, in some instances, this may be desirable.

The base will normally be employed in an amount which is chemically equivalent to the ester group content of the esterified phenolic compound. However, for some applications it might be necessary or desirable to keep free ester present and for others an excess of base may be present.

The molar ratio of total phenol: total alkali metal (Na, K, Li) in the composition of the invention will typically be in the range of from 1:0.3 to 1:1.4. The use of any higher ratio results in too fast a reaction while ratios lower than 0.3 mole of alkali per mole of phenol leave unreacted ester and, therefore, give lower final strengths. Preferably, the molar ratio of total phenol: total alkali in the composition will be in the range of from 1:0.5 to 1:1.1.

As mentioned above, the present invention has particular utility in the production of foundry moulds and cores. According to this, a major proportion of a granular refractory material such as foundry sand will be mixed with a minor proportion of the phenolic novolak resin and also the esterified phenolic compound. The phenolic novolak resin and the esterified phenolic compound react together in the presence of a base and water and/or other polar solvent to form a cured phenolic resin composition which binds the granular refractory material together. As will be realized, the amount of phenolic novolak resin required for addition to the granular refractory material will depend on a number of factors including the molecular weight of the novolak resin, the free phenol content of the novolak resin, since higher free phenol contents tend to give lower strengths, the type and amount of the esterified phenolic compound, the type and amount of base and the amount of water or the type and amount of other polar solvent present. In general, however, we would expect to use from 0.1 to 10% by weight, based on the weight of the granular refractory material, of the phenolic novolak resin and preferably from 0.5 to 5% by weight of the phenolic novolak, based on the weight of the granular refractory material. It is possible to use reclaimed sand as the granular refractory material, in which case the addition of a base, as heretofore described, may not be necessary or a base may be added in an amount less than that which would be required if the granular refractory material was not itself alkaline. Furthermore, the granular refractory material used may, itself, contain moisture such that the requirement for added water to cause the reaction to proceed would be reduced.

As mentioned earlier, phenolic novolak resins are storage stable. Also, esterified phenolic compounds containing one or more esterified phenolic hydroxyl groups, no free phenolic hydroxyl groups and one or more esterified methylol groups positioned ortho and/or para to an esterified phenolic hydroxyl compound, may be mixed with a phenolic novolak resin to give a mixture which is storage stable but which will undergo reaction to produce a cured phenolic resin composition when brought into contact with a base and water or other polar solvent. If an anhydrous base, such as anhydrous calcium oxide or anhydrous magnesium oxide is used, then a mixture comprising an anhydrous novolak resin, an anhydrous fully esterified phenolic compound and anhydrous base will not undergo any substantial reaction but will do so if contacted with water. This contact with water can be brought about by the use of moist air or steam. It will be understood, therefore, that such forms the basis of a gas or vapor curing technique for the cure of phenolic resin compositions.

According to a further embodiment, the invention provides a two component system for use in the production of a cured phenolic resin composition which comprises as a first component, a mixture of an anhydrous phenolic novolak resin and an anhydrous esterified phenolic compound containing one or more esterified phenolic hydroxyl groups and one or more esterified methylol groups positioned ortho and/or para to an esterified phenolic hydroxyl group and containing no free phenolic hydroxyl groups, and comprises as a second component, an anhydrous base, wherein said first component and second component, when mixed together, undergo reaction in the presence of water. In an especially preferred embodiment, the first component comprises a mixture of 2,4,6-tris(acetoxymethyl) phenol acetate, as the fully esterified phenolic compound, a phenolic novolak resin (e.g. 2,6-bis (o-hydroxy benzyl) phenol) and a polar solvent comprising a mixture of ethylene glycol and phenoxyethanol. Preferably, the second component comprises anhydrous calcium oxide, which is premixed with the foundry sand. As stated above, in order to bring about the cure of the phenolic resin in order to bind the foundry sand, the anhydrous mixture of components, including the sand, may be gassed with water-vapor and/or steam. Gassing will typically be achieved by sucking steam and/or water vapor obtained from a steam generator through the shaped mixture of the sand, base, novolak resin and esterified phenolic compound in a core box by means of a vacuum. Unlike other prior art gas curing techniques used in the production of foundry moulds and cores, this embodiment of the invention avoids the use of noxious, flammable and relatively expensive gassing catalysts to effect the cure of the phenolic resin binder.

In addition to the esterified phenolic compound, the phenolic novolak resin, the base, and solvent, one may also incorporate other materials and substances into a foundry moulding composition which are conventionally used to improve properties and characteristics of foundry moulding compositions. For instance, a silane may be added to increase the bond strength of the binder with the sand (or other granular refractory material) (such silanes are well-known in the art) and/or a surfactant may be used to improve wetting of the sand (or other refractory) grains by the binder.

Depending on the choice of components used in the present invention, it is possible to achieve some or all of the following advantages compared to conventional resole/ester systems:

A. very high strengths may be obtained,
B. virtual elimination of formaldehyde evolution on cure may be obtained when no methylol groups are present in a free state,
C. a reduction in phenol evolution and leaching may be obtained with the use of low free phenol novolaks,
D. storage stable components may be obtained with the use of fully esterified phenolic compounds,
E. it is possible to control setting times, bench life/strip time ratios, and the degree of thermoplasticity in the product,
F. virtual elimination of free alcohol by-product on saponification of ester may be obtained since this becomes part of the crosslinked resin.

The compositions of the present invention may have other uses such as in the production of phenolic foams and in rock bolt grouting systems for mining applications.

EXPERIMENTAL

1. Preparation of Methylol Group Containing Phenolic Compounds Product No. 1,1-Saligenin Saligenin (orthomethylol phenol, 2-(hydroxymethyl)-phenol)

This product was used as purchased from Aldrich Chemical Company.

Product No. 1,2—Phenol-Formaldehyde Resole (Molar Ratio F:P=1.6:1; Solids=70%)

Phenol (1 mol) and 50% formalin (0.6 mol) were charged to a reaction vessel and the temperature maintained below 40° C. whilst sodium hydroxide (0,004 mol) was added. The temperature was then raised to 80° C. The temperature was maintained at 80° C. while a second charge of 50% formalin (1.0 mol) was added slowly over 30 minutes and the temperature maintained at 80° C. for a further 15 minutes. The mixture was then held at 70° C. for a further 30 minutes. The pH was adjusted with p-toluene sulphonic acid solution to 4.0+/−0.2 and the volatiles distilled off under vacuum at 70° C. to a viscosity of 80 centistokes at 25° C. The resin was cooled to 60° C., the pH adjusted to 6.2+/−0.2 with sodium hydroxide, 0.027 moles of urea were added and the product was further concentrated to a final viscosity of 500 cP at 25° C., cooled and discharged.

Product No. 1.3—Phenol-Formaldehyde Resole (Molar Ratio F:P=2.5:1 Solids=77%)

Phenol (1 mol) and 50% formaldehyde (0.6 mol) were charged into a reaction vessel and the temperature held below 40° C. while magnesium oxide (0,003 mol) was added and well dispersed. The temperature was then allowed to rise to 70° C. over 30 minutes and maintained at this temperature while a second charge of 60% formaldehyde (1.9 mol) was added slowly over one hour and then held for a further 30 minutes. The temperature was then lowered to 55° C. and vacuum distillation commenced until a viscosity of 85 cSt at 25° C. was obtained, the temperature was then raised once more to 80° C. and held for one hour, the resin was then cooled to 65° C. and held until water dilutability (resin: water, by volume) reached 1:4 at 25° C. The product was then cooled to room temperature and discharged.

Production No. 1.4—Phenol-Formaldehyde Resole (Molar Ratio F:P=2.0:1; Solids=65%)

Phenol (1.0 mol) and 50% formaldehyde solution (0.6 mol) were charged into a reaction vessel and the temperature held at 44° C. while 50% sodium hydroxide (0.04 mol) was added. The mixture was then heated to 80° C. and a second charge of 50% formaldehyde solution (1.4 mol) was added slowly over a period of 25 minutes. The mix was then held at 80° C. until the viscosity reached 550 cP (about 6 hours). The product was finally cooled to room temperature and discharged.

Product No. 1.5—Phenol-Formaldehyde Resole (Molar Ratio F:P=1. 81;1; Solids=60.5%)

A reactor was charged with 1,061.9 g (11.30 moles) of phenol and 95.55 g (0,768 moles) of a 45% aqueous solution of potassium hydroxide. This mixture was heated to 60° C., then 1,225.7 g (20.43 moles) of warm, 50% aqueous formaldehyde was added over 30 minutes, while the temperature of the reaction mixture rose to 105° C. The reaction mixture was then cooled and held at 75° C.–80° C. until a Gardner viscosity (25° C.) of T-U (approximately 600 centistokes) was attained.

The resin solution was then rapidly cooled to room temperature. The yield of resin solution was 2263g. The water content as determined by Karl Fisher filtration was 32.1%. The free phenol content was 2.3%. The solids content, as determined by oven drying at 135° C., was 60.5%. The product was a resole made from a reaction mixture having a F:P molar ratio of 1.81:1 and a potassium:phenol (K:P) molar ratio of 0.068:1.

Product No. 1.6—Phenol-Formaldehyde Resole (Molar Ratio F:P=2.0:1; Solids=54%)

Phenol (1 mol), KOH (0.019 mol) and triethylamine (0.07 mol) were charged into a reaction vessel and the temperature adjusted to 50°-55° C. Formaldehyde (3.0 mol) was added slowly over a period of 90 minutes with the temperature being maintained at 60°-65° throughout. The mix was held at this temperature for a further period until the free formaldehyde content (as measured by the hydroxylamine hydrochloride method) fell below 9%. The product was cooled and discharged. Water was added to give a viscosity of 30 cP at 25° C. (Brookfield Viscometer). The solids content was 54%.

PREPARATION OF ESTERIFIED METHYLOL GROUP CONTAINING PHENOLIC COMPOUNDS

Product No. 2.1—Saligenin Monoacetate

Acetic anhydride (59 g, 0.58 mol) was mixed with pyridine (50 g) and Product No. 1.1 (72 g, 0.58 mol) added slowly with stirring and cooling to prevent the temperature exceeding 50° C. The mixture was allowed to stand overnight at room temperature and then poured into a large excess of cold water. Diethyl ether was added and the reaction product extracted, then washed with water, then with 1% hydrochloric acid and then again with water. The organic layer was dried and the ether removed under vacuum leaving a pale yellow oil.

Production No. 2.2—Saligenin Methacrylate

Product No. 1.1 (13.5 g, 0.11 mol) was dissolved in pyridine (8.6 g) and dichloromethane (200 ml). Methacryloyl chloride (11.4 g, 0.11 mol) in dichloromethane (50 ml) was added slowly with stirring, whilst the temperature was maintained below 40° C. The mixture stood for a further hour and was then refluxed for 20 minutes. The product was cooled, washed with water, dilute acid and water again, dried over anhydrous sodium sulphate and evaporated under vacuum to remove the solvent.

Product No. 2.3—Formulated Product 1.2

Formic acid (46 g) and acetic anhydride (102 g) were slowly mixed while the temperature was held below 45° C. The mixture was left to stand for one hour at 45° C. and then cautiously added to a mixture of Product No. 1.2 (100 g) plus pyridine (7.9 g) while immersed in an ice/water bath to hold the temperature below 20° C. The mixture was then allowed to stand overnight at room temperature. Ethyl acetate was then added to the mixture, and the product extracted. The extract was washed several times with water, then with dilute acid and finally with water again and the organic phase was dried, filtered and evaporated to dryness. A viscous, straw-colored liquid (Product No. 1.2 formate) was obtained.

Product No. 2.4—Partly Acetylated Product No. 1.3

Product No. 1.3 (50 g) and pyridine (75 g) were mixed and acetic anhydride (25 g) added cautiously with stirring, the temperature being maintained below 40° C. The mixture was left overnight and then poured into a large excess of iced water. Ethyl acetate was added and the product extracted, washed with water several times, then with dilute acid and finally again with water. The organic layer was dried and the solvent was then removed under vacuum.

Product No. 2.5—Highly Acetylated Product No. 1.3

The procedure described for the preparation of Product No. 2.4 was repeated but using Product No. 1.3 (50 g), pyridine (75 g) and acetic anhydride (50 g).

Product No. 2.6—Acetylated Product No. 1.3 (Using Ketene)

Product No. 1.3 (phenol-formaldehyde resole of F:P molar ratio 2.5:1) (400 g) was dissolved in acetone (100 ml) and stirred continuously while ketene, generated in situ with a ketene lamp, was passed for 6 hours at 0.5 mol per hour. The product was extracted into ethyl acetate, washed with water several times, then with dilute acid and finally with water again. The organic layer was dried and the solvent removed under vacuum. A saponification value of $6.3 \times 10^{-3}$ mol per gram was obtained.

Product No. 2.7—Formulated Product No. 1.3

The procedure described for the preparation of Product No. 2.3 was followed except that Product No. 1.3 (200 g) was used in place of Product No. 1.2.

Product No. 2.8—Acetylated Product No. 1.4 (Using Ketene)

Product No. 1.4 (90 g) was dissolved in acetone (100 ml) and stirred continuously while ketene (generated in situ using a ketene lamp) was passed for 2 hours at a rate of 0.5 mol per hour. The product was extracted into ethyl acetate, washed with water several times, then washed with dilute acid and then washed again with water. The organic layer was then dried and the solvent removed under vacuum.

Product No. 2.9—Saligenin Salicylate

Thionyl chloride (1 mol) in dichloromethane (400 ml) was added drop wise and with constant stirring to a dispersion of sodium salicylate (1 mol) in dichloromethane (800 ml). The mixture was stirred for a further hour, then left to cool to room temperature, care being taken to avoid absorption of atmospheric moisture. This solution was then added drop wise and with vigorous stirring to a solution of Product No. 1.1 (1 mol) and pyridine (2 mol) in dichloromethane (1200 ml). After addition was completed, the mixture was heated to 40° C., held at this temperature for 10 minutes and then allowed to cool. The reaction mixture was then washed several times with water and dilute acid until no traces of pyridine remained. The organic phase was then dried over anhydrous sodium sulphate, filtered and stripped of solvent to obtain saligenin salicylate in 60% yield.

Product No. 2.10—Saligenin Diacetate

Acetic anhydride (82.3 g, 0.806 mol) was mixed with pyridine (130 g) and Product No. 1.1 (50 g, 0.403 mol) added slowly with stirring and cooling to prevent the temperature exceeding 50° C. The mixture was allowed to stand overnight at room temperature and then poured into a large excess of cold water. Diethyl ether was added and the reaction product extracted, washed with water, then washed with 1% hydrochloric acid and then again washed with water. The organic layer was dried and the ether removed under vacuum leaving a pale yellow oil.

Product No. 2.11—Diacetate of 2,6-dimethylol-p-Cresol

The diacetate of 2,6-dimethylol-p-cresol (DMPC) was prepared by reacting 3.4 g of the dimethylol cresol with 4.8 g of acetic anhydride in the presence of 7.8 g of tetrahydrofuran.

After 66 hours at room temperature, the reaction solution was diluted with 5 g of methylene dichloride, then washed several times with 15 ml of cold water. An organic layer of about 10 g was dried with 2 g of anhydrous sodium sulphate.

Product No. 2.12—Diacetoacetate of 2,6-Dimethylol-Para Cresol (DMPS) Using Diketene)

A reaction vessel was charged with 3.4 g (0.02 mols) of DMPC in 5 g of tetrahydrofuran and 0.1 g of anhydrous sodium acetate. After these ingredients were charged to the reactor, 3.4 g (0.04 mols) of diketene was added. This mixture was stirred at room temperature, with heating in a water bath to maintain it at 25°–35° C., for about 4 hours. At the end of this time, the reaction mixture was essentially homogeneous. The resulting product was the di(acetoacetic) ester of DMPC.

Product No. 2.13—Saligenin Formate

Saligenin formate was produced by the reaction of saligenin with methyl formate. Thus 5.0 g of saligenin and 20 g of methyl formate, together with 0.1 g. of imidazole, were charged to a reactor flask that was equipped with a stirring bar. The mixture was allowed to stand at ambient temperature for two days.

Mild vacuum was then applied to the reaction mixture at room temperature, as the mixture was agitated using the stirring bar, to strip off volatiles. The yield of nonvolatile product was 6.3 g, a gain of 1.3 g as compared to the theoretical possible gain of 2.5 g. The recovered methyl formate was returned to the flask, and the contents of the flask were permitted to stand for three days at ambient (room) temperature. The volatiles were then stripped off until the flask weight remained constant. The yield of nonvolatile, wet solid product was 6.8 g, for a total gain of 1.8 g. Assuming that there were no side reactions, this represented an approximately 70% conversion.

Upon treatment of a sample with 20% caustic in N,N-dimethyl acetamide, the product sample became heterogenous and eventually separated into two layers. The upper layer was light amber in color and was about twice the volume of the lower layer. The lower layer was almost colorless. The top layer had a consistency similar to that of medium pancake syrup.

Product No. 2.14—Trimethylol Phenol Tetraacetate (2,4,6-Tris(Acetyloxymethyl) Phenol Acetate)

Acetic anhydride (65.81kg) was charged to a steam heated stainless steel vessel equipped with reflux and and vacuum and heated to 90°–95° C.

2,4,6-Tris(dimethylaminomethyl) phenol (34.19kg) was slowly added to the acetic anhydride while maintaining temperature above 90° C. but not more than 100° C. The reaction mixture was then held at 90°–100° C. for 2 hours. A sample taken at this stage had an RI of 1.4500.

Vacuum was applied and the product was distilled under full vacuum and heating until the temperature rose to 135° C. The RI of a sample taken at this stage was 1.502. The trimethylol phenol tetraacetate (TMPTA) produced was substantially free from dimethyl acetamide bi-product and was cooled to 50° C. and discharged. Yield was 43.5%.

Product No. 2.15—Acetylated Product No. 1.6

Product No. 1.6 (100 g) was dissolved in acetone (1500 ml) and stirred continuously while ketene (generated in situ using a ketene lamp) was passed for 4 hours at a rate of 0.5 mol per hour. The product was extracted into methylene dichloride, washed with water several times, then washed with dilute acid and then washed again with water. The organic layer was then dried and the solvent removed under vacuum.

PREPARATION OF PHENOLIC NOVOLAK RESINS

| Novolak Resin A | | |
|---|---|---|
| Phenol 100% | 94.00 g | 1 mole |
| 50% Formalin | 35.992 g | 0.6 moles |
| Salicylic acid | 2.127 g | |
| 1.84 SG Sulphuric acid | 0.304 g | |
| 0.88 ammonia | 0.447 g | |

1 mole of phenol was charged to a flask fitted with reflux and condensing facilities and vacuum and heated to 80° C. Sulphuric acid and salicylic acid were added and stirred until dissolved, then heated to 100° C. 0.6 moles of 50% formalin was added over 1½ hours. Reflux was continued for 1½ hours. The 0.88 ammonia was added and water distilled off under atmospheric pressure until the temperature rose to 150°–155° C. Steam was passed into the resin to remove free phenol. Viscosity was measured at intervals after removal of all the residual water by vacuum distillation up to 150°- 155° C. under 26-27 inches Hg. Steam distillation was continued until viscosity rose to 10-13 Poises at 125° C. using a 40 Poise cone at 125° C. on an ICI melt viscometer (available from Research Equipment Ltd).

Resin A has an intermediate average molecular weight (~850), it has a low free phenol content and is not predominantly ortho or para substituted.

| NOVOLAK RESIN B | | |
|---|---|---|
| Phenol 100% | 94.00 g | 1 mole |
| Oxalic acid | 2.21 g | |
| 50% formalin | 29.999 g | 0.5 moles |
| 32% NaOH soln | 1.028 g | |

The same method of manufacture was employed as for resin A above except that the catalyst used was oxalic acid, and the neutralizing alkali was a 32% caustic solution. The free phenol was removed to a level of <2.2% and melt viscosity was 3.0-6.0 Poises at 125° C. using a 40 Poise Cone.

| Novolak Resin C | | |
|---|---|---|
| Phenol | 94.00 g | 1.0 mole |
| Oxalic acid | 1.41 g | |
| 50% formalin | 49.21 g | 0.82 moles |

The method of manufacture was the same as for resin A in Example 1 except that oxalic acid was used as the catalyst. Reflux was extended to 2 hrs, no steam distillation was applied and melt viscosity was 40-60 Poises at 150° C. using a 100 Poise cone.

EXAMPLES OF THE INVENTION

Example 1

Reaction of phenolic resin A with trimethylol phenol tetraacetate

An aqueous KOH solution of resin A was prepared to have a 70% solids content and to give a K:Ac mole ratio of 1:1 when 30% of trimethylolphenol tetraacetate (TMPTA) was added as curing agent.

Studies of gel time and shore 'D' hardness showed that 30% TMPTA addition on the alkaline novolak resin (70% solids) gelled in about 90 seconds with a resulting shore 'D' hardness after 24 hours of 65. The gelled material was found to be very brittle. Ethylene glycol (10% by weight based on the weight of the alkaline novolak solution) was added to the alkaline novolak to reduce the brittleness.

The first sand cores produced using 1.66% novolak addition on sand with 30% TMPTA on novolak gave a sand core strength of 2820 kNm$^{-2}$. A further addition of ethylene glycol to the ester/sand mix (about 10% on novolak addition) increased this figure to 4385 kNm$^{-2}$ after 24 hours.

Example 2

Preparation of alkaline novolak resin solution 500 g of the phenolic novolak resin A was crushed and added to 100 g of ethylene glycol in a 1 liter pyrex beaker. The novolak was melted using an electric hot plate at 100° C. The novolak solution was then cooled to 60°-70° C. whereupon 500 g of 40% potassium hydroxide was added (3.6 mol of alkali). The alkaline novolak was then cooled to room temperature and the viscosity was lowered by water addition until a figure of between 5-10 Poise was reached. Surfactant (1% Texapon) and silane (0.4% Ameo) were added.

Using an alkaline novolak resin solution as prepared in 1 above (having a solids content of 62% by weight) and TMPTA as the esterified phenolic compound, we prepared a number of sand cores in order to study the effect of increasing the level of binder (based on the weight of sand) on the sand core strength. The results are shown in Table 1 below.

TABLE 1

| Novolak Solution (Example 2.1) | TMPTA | Novolak Solution On Sand (%) | P:F:K:Ac | Core Strength 24 hour (kNm$^{-2}$) |
|---|---|---|---|---|
| 4.5 g | 3.0 g | 0.75 | 1:1.5:0.56:1.36 | 1695 |
| 6.0 g | 4.0 g | 1.0 | 1:1.5:0.56:1.36 | 2770 |
| 7.5 g | 5.0 g | 1.25 | 1:1.5:0.56:1.36 | 3530 |
| 9.0 g | 6.0 g | 1.5 | 1:1.5:0.56:1.36 | 4475 |

Example 3

Using alkaline novolak resin solutions (solids content 62% by weight) prepared as described above in Example 2 and TMPTA, we carried out a study of the effect of increasing the level of TMPTA used on the sand core strength. The results are shown in Table 2 below.

TABLE 2

| Novolak Solution (Example 2.1) | TMPTA (%) | P:F:K:Ac | Core Strength 24 hour (kNm$^{-2}$) |
|---|---|---|---|
| 10 g | 2 g (20) | 1:1.02:0.72:0.53 | 1745 |
| 10 g | 3 g (30) | 1:1.14:0.68:0.74 | 4270 |
| 10 g | 4 g (40) | 1:1.26:0.64:0.94 | 4985 |
| 10 g | 6 g (60) | 1:1.46:0.58:1.26 | 5175 |

It is clear from Table 2 above that the ester addition level is ideally between 40 and 60% for the alkaline novolak resin solution employed. At 25-30% addition the K/Ac mol ratio is approximately 1, which theoretically should leave no unreacted ester. However, strengths are seen to continue to increase when excess ester is added.

Clearly the K/Ac ratio is not the predominant factor in determining the sand core strength of the system.

Example 4

The alkaline novolak Resin A solution used in Examples 2 and 3 had a solids content of approximately 62%. To study the effect of the solids content of the novolak solution on sand core strength, the novolak solution was diluted by various degrees and the level of resole ester added kept constant at 30%. The results are shown in Table 3 below.

TABLE 3

| Novolak Solution wt | H$_2$O | TMPTA wt | Solids in novolak Solution % | Core strength 24 hour (kNm$^{-2}$) |
|---|---|---|---|---|
| 10 g | — | 3 g | 62.7 | 4805 |
| 9.5 g | 0.5 g | 3 g | 58.9 | 4950 |
| 9.0 g | 1.0 g | 3 g | 56.5 | 4225 |
| 8.5 g | 1.5 g | 3 g | 53.3 | 4440 |
| 8.0 g | 2.0 g | 3 g | 50.2 | 4150 |

In Table 3 the reduction in the amount of novolak solution added to the sand from 10 g (1.67%) to 8.0 g (1.33%) is equivalent to reducing the solids from 62%–50%. The drop in 24 hour strength about 14%, from 4805–4150 kN m$^{-2}$. This indicates that the solids content in the range studied can achieve adequate strengths for foundry applications.

Example 5

Commercially available novolaks range from Bisphenol F having two phenol rings through to a number of high mol. weight novolaks having in the region of 20 rings in the molecule. The size/weight is determined by the F/P ratio whilst the structural character, i.e. ortho or para linkage, is determined by the catalyst used in the preparations. The melt viscosity of the novolak solution gives some indication of molecular size. To test the suitability of the different novolak types, a selection was made which substantially covered the range above. The preoperative details of phenolic novolak resins A, B and C used in this Example are set out earlier in the 'Experimental Section'.

The alkaline novolak solutions used in this example were prepared according to the method described above in Example 2.1. and their reactivities were assessed by recording a gel time using TMPTA as the esterified phenolic compound. The results are shown below in Table 4.

TABLE 4

| Novolak Base | Bisphenol F | Resin B | Resin A | Resin C |
|---|---|---|---|---|
| No. of phenol rings | 2 | 5 | 8 | 20–25 |
| Structural Character | Para | Para | Ortho/Para | Para |
| Free Phenol (%) | 0.6 | 2.0 | <2.0 | 5.0 |
| Viscosity (Poise) | 5 | 10.7 | 8.5 | 7.0 |
| Solids (%) | 56.7 | 60.2 | 62.7 | 53.0 |
| Gel Time (min) | 10 min. (40% TMPTA) | 3 min. 15 sec. (40%) | 2 min. 10 sec. (40%) | 1 min. (40%) |

It will be seen from the results in Table 4 that the gel time is reduced as the mol. size of the novolak resin increases.

Example 6

Using the alkaline novolak resin solution prepared as described in Example 2 above (1.67% by weight of novolak solution on sand), we carried out a study of the effect on gel times and the sand core strengths of using a number of different esterified phenolic compounds. The results of this study are shown below in Table 5.

The esters used in this example were TMPTA, 2,6-dimethylol-p-cresol triacetate, 2,6-dimethylol phenol triacetate, 2,2',6,6'-tetramethylol Bisphenol A hexaacetate and the resole resin acetates, Product No. 2.5 and Product No. 2.15. The preoperative details for these resole acetates are set out in the preceding EXPERIMENTAL Section.

TABLE 5

| Ester | F/P | Ac/P | % Addition | Gel Time | 24 hour Sand Core Strength (kNm$^{-2}$) |
|---|---|---|---|---|---|
| TMPTA | 3 | 4 | 40 | 2 min 10 secs | 5405 |
| Dimethylol p-cresol triacetate | 2 | 3 | 40 | 7 min 15 secs | 2530 |

TABLE 5-continued

| Ester | F/P | Ac/P | % Addition | Gel Time | 24 hour Sand Core Strength (kNm$^{-2}$) |
|---|---|---|---|---|---|
| Dimethylol phenol triacetate | 2 | 3 | 40 | 5 min 45 secs | 2770 |
| Tetramethylol Bisphenol A hexa acetate | 2 | 3 | 40 | 15 min 15 secs | 550 |
| resin Product No. 2.5 | 2.5 | 2.5–3 | 30 | 7 min 15 secs | 1190 |
| resin Product No. 2.15 | 2.1* | 3 | 40 | 5 min 30 secs | 1740 |

*The effective mol. ratio when unreacted formaldehyde is taken into account.

The above table shows that the resole esters (Products Nos. 2.5 and 2.15) used do not produce sand cores of the strength of TMPTA hardener systems. All the esters have lower F/P and Ac/P ratios than TMPTA, which has the maximum number of methylol groups (and hence acetates) that is possible in a resole ester.

The gel times of all the esters and the alkaline novolak resin are longer than those achieved using TMPTA, which may mean that the ultimate strength of the cores will be higher than that reached after 24 hours. The longer gel times also allow these esters to be used with higher mol. weight novolaks, which may gel too quickly with TMPTA for foundry applications. This effect was the subject of a further study, the results of which are shown below in Table 6.

TABLE 6

| | Novolak Solution (1.67% on Sand) | | |
|---|---|---|---|
| Resole ester 40% addition | Novolak C (53% solution) | Novolak A (62.7% solution) | Novolak B (60.2% solution) |
| | 24 hr core strength kNm$^{-2}$ (gel time) | | |
| Resin (Product No. 2.15) | 4590 (2 min 10 sec) | 1740 (5 min 30 sec) | 1000 (31 min) |
| Dimethylol p-cresol triacetate | 3750 (3 min 20 sec) | 2530 (7 min 15 sec) | — |
| Resin (Product No. 2.5) | 2880 (3 min 45 sec) | 1305 (7 min 15 sec) | 1580 (9 min 15 sec) |
| TMPTA | | 5405 (2 min 10 sec) | 4875 (3 min 15 sec) |

The optimum proportion of novolak to esterified resole is obtained by equating the number of free reactive positions in the novolak and the esterified nethylol groups in the resole.

The results in Table 6 above show clearly that the higher the mol. weight of the novolak resin, the shorter the gel time and hence the workable life of a foundry sand mix. However, the strength of the sand core produced increases as the mol. weight of novolak increases. For example, Product No. 2.15 resole resin produces a low strength core (1740 kNm$^{-2}$) after 24 hours with novolak A (medium molecular weight) but when used with novolak C (high molecular weight) the core strength increases to 4590 kNm$^{-2}$. This is significant in that it allows some degree of freedom in the type of novolak and ester which may be employed, enabling the systems to be tailored to different applications.

Example 7

Despite the very high strengths obtained with the potassium based novolaks, the fast gel times and bench life of the TMPTA/alkaline novolak systems required that alternative alkalis to potassium hydroxide be tested for comparison. As the basicity of alkali metals decreases in the order K>Na>Li, the use of sodium and lithium should result in a reduction in the reactivity of the TMPTA and hence an increase in the gel time and bench life. Calcium oxide was included in the study, which although having very low solubility in aqueous solutions, is sufficiently soluble in the presence of the weakly acidic novolak to allow the preparation of an approximately equivalent material.

The various alkaline solutions of phenolic novolak resin A used in this example were prepared in a manner similar to that described in Example 2 although the solids level used were individually adjusted for viscosity reasons. The gel times and core strengths achieved are shown in Table 7.

TABLE 7

| Alkaline novolak Solution* | Solids % | Mol OH/ 100 g | Gel Time | Core Strength (kNm$^{-2}$) (1 hour) | (24 hour) |
|---|---|---|---|---|---|
| K+ | 57.3 | 0.308 | 2 min 15 sec (40% TMPTA) | 3875 | 5680 |
| Na+ | 54.0 | 0.288 | 4 min 20 sec (40%) | 1370 | 5325 |
| Li+ | 56.0 | 0.307 | 4 min 45 sec (40%) | 535 | 5195 |
| Ca++ | 42.0 | 0.182 | 15 min 0 sec (30%) | <50 | 2220 |

*1.67% novolak solution on sand.

The table shows that the less reactive alkalis do increase gel times and prevent the fast buildup in strength seen with KOH. The 24 hour strengths, however, of Li+ and Na+ are in excess of 5000 kNm$^{-2}$, indicating that the lithium- and sodium- containing novolak solutions are eminently suitable for use in foundry applications.

Example 8

Studies were carried out on the effect of various solvents on sand core strengths using the TMPTA/alkaline novolak A system.

The first study was to compare the performance of each solvent when added as an extra component to a mix of sand and TMPTA prior to the addition of the alkaline novolak resin A (which as prepared according to the method set out in Example 2 above, already contains ethylene glycol). The results are shown in Table 8 below.

TABLE 8

| Solvent | CORE STRENGTH (kNm$^{-2}$) 2 hours | 24 hours |
|---|---|---|
| Diacetone alcohol | 2745 | 3785 |
| Ethyl digol | 2950 | 3920 |
| Ethoxy ethanol | 2840 | 3810 |
| Phenoxy ethanol | 3395 | 4160 |
| Diethylene glycol | 3180 | 4190 |
| Triethanolamine | 2255 | 4035 |
| Ethylene glycol | 3130 | 3905 |
| Standard | 2270 | 3445 |

The alkaline novolak solution (Example 2.1) contained 8.6% ethylene glycol, 30% TMPTA was added and 10% solvent was added to the sand, based on the novolak solution. About 1.67% novolak solution was used, based on sand.

The results show that all the solvents used in addition to the ester/sand mix improve core strength above the performance achieved with the standard material where no additional solvent was added.

The above study was repeated using an alkaline novolak solution containing no ethylene glycol and the results are shown in Table 9 below.

TABLE 9

| Solvent | CORE STRENGTH (kNm$^{-2}$) 2 Hour | 24 Hour |
|---|---|---|
| Diacetone alcohol | 1505 | 995 |
| Ethyl digol | 2050 | 2380 |
| Ethoxy Ethanol | 1030 | 840 |
| Phenoxy Ethanol | 2065 | 2145 |
| Diethylene glycol | 2690 | 3955 |
| Ethylene glycol | 2545 | 3400 |
| Blank | 1290 | 1035 |

The aqueous alkaline novolak solution contained no ethylene glycol (see the method of preparation of alkaline novolak in Example 2 above), 30% TMPTA was added and 10% solvent was added to the sand, based on the novolak solution. About 1.67% novolak solution was used, based on sand.

From Table 9, it will be seen that all the sand cores produced from the aqueous alkaline novolak solution are weaker in strength than equivalent cores using ethylene glycol based novolak solution. Notably, the performance of the ether and ketone alcohols drops more sharply than the dialcohols, diethylene and ethylene glycol. This suggests that dialcohols are more efficient plasticers in this application than ether alcohols or that another property of the dialcohol is aiding performance, e.g. increased "wetting" of sand leading to improved resin/sand interaction.

A third study on the effect of solvents looked at the replacement of ethylene glycol in the alkaline novolak with ether and ketone alcohols. Three novolaks were prepared using diacetone alcohol, ethyl digol and phenoxy ethanol as the replacement for ethylene glycol in the alkaline novolak solution, using a procedure similar to that of Example 2.1. Sand cores were compared with the addition of no solvent, with extra base solvents and with ethylene glycol to the sand/ester mix. The results are shown in Table 10 below.

TABLE 10

| Novolak A | 40% TMPTA, 10% solvent addition on novolak solution, 1.67% novolak solution on sand CORE STRENGTH (24 hours) kNm$^{-2}$ | | |
|---|---|---|---|
| Base solvent in alkaline novolak | No Solvent added to sand/ester mix | 10% of base solvent added to sand/ester mix | 10% ethylene glycol added to sand/ester mix |
| Diacetone alcohol | 2460 | 4770 | 5435 |
| Ethyl digol | 3760 | 4725 | 5860 |
| Phenoxy ethanol | 2885 | 5850 | 6020 |
| Ethylene glycol | 3445 (30% TMPTA) | 6110 (Phenoxy ethanol added) | 5190 |

The results in Table 10 show that solvent addition on sand combined with a base solvent in the novolak solution improves the strength of sand cores. Using ethylene glycol in either the novolak solution or on sand increased core strength further. The combination of ethylene glycol and phenoxy ethanol as base solvents in novolak or sand achieved the best results of the entire study, in excess of 6000 kNm$^{-2}$.

Example 9

One of the major advantages of a fully esterified resole ester/alkaline novolak foundry binder is that the components are storage stable at elevated temperatures. TMPTA is heat stable at temperatures in excess of 100° C. There are no reactive components in an alkaline novolak to cause any change in molecular weight.

Samples of TMPTA and alkaline novolak A were stored for 50 days at 40° C. Viscosity increased in the novolak from 6 poise to 16 poise due to evaporation of solvent. There was no change in viscosity of the resole ester. Sand cores prepared from the 50 day old samples achieved strengths of 4800 kN m$^{-2}$ compared to 4985 kNm$^{-2}$ achieved from the same system after 1 day storage. This is very sound evidence that the components of the resole ester/alkaline novolak are storage stable.

NOTE: Preparation of the sand cores in the above Examples

For most tests 3 cores were prepared form 600 g Chelford 50 sand. The desired amount of resole ester and solvent were weighed into a 20–30 g portion of sand. This was premixed by hand before addition to the remainder of the sand whereupon mixing for 60 seconds was carried out using a Kenwood chef mixer.

The desired amount of alkaline novolak solution was weighed onto a 20–30 g portion of the resole ester/sand mix. This was pre-mixed by hand for 15 seconds before addition to remainder of sand mix whereupon further mixing took place using the Kenwood mixer for 30 seconds.

The cores were immediately rammed using the AFS method for sand core preparation.

The cores prepared were tested for strength after 2 hours and 24 hours.

The present invention is believed to be useful in applications other than foundry mould and core making. The following examples illustrate applications of the present invention in the production of phenolic foams and in a rock bolt grouting system.

Example 10

A premix of 25 part by weight of TMPTA, 1 part by weight of surfactant DC 193 (a commercially available silicone glycol polymer from Dow Corning Corporation) and 15 parts by weight of ARCTON II ("ARCTON" is a registered Trade Mark, ARCTON II is a commercially available CFC blowing agent of ICI Chemicals & Polymers Ltd.) was prepared and cooled to 5° C. About 55.3 g of the premix was then mixed with 100 g of a KOH solution of a resorcinol modified phenol-formaldehyde novolak resin having a solids content of 70% by weight and a viscosity of 12.5 poise at 25° C., wherein the resorcinol accounts for 10% of the total resin and wherein the alkaline novolak solution has a K/P/F molar ratio of 1.1/1/1.1. An exothermic reaction occurred after mixing and the mixture was then foamed in a conventional way. After standing, the foam had a foam density of 3.3 lbs/cu. ft and an estimated compressive strength of 0.12 N/mm$^2$. In a fire test, the foam was seen to punk with minimal spread of flame and no ignition of volatiles.

Example 11

Method 20 g KOH solution of phenolic novolak resin A (see earlier) having a viscosity of 8.5 Poise at 25° C. and a solids content of 62.7% by weight and containing 17.1% by weight KOH, were weighed into a beaker. Filler (chopped glass or Wollastonite) was added in an amount to provide a novolak: filler weight ratio of 1:1 or 2:1. TMPTA (30% or 40% by weight based on the weight of the novolak resin) was then added and the contents of the beaker were mixed for 30 seconds after which they were pored into the lower plate of a specimen mould. The apparatus used for the tests comprised a specimen mould having two metal plates used to shape the test pieces of 100×25mm area and 2 mm thickness, a tensomether with a 2000 N beam, a punch of 6.35 mm diameter and a micrometer. The test mixture was transferred to the lower plate of the specimen mould the upper plate was then clamped in position until the mixture gelled. Test pieces were removed and the thickness measured using the micrometer. Punch shear strengths were measured after 1 hour and 24 hours from mixing. The results are shown in Table 11.

TABLE 11

| Novolak (in solution) | % TMPTA | FILLER (novolak: filler wt ratio) | S(MPa) 1 hour | 24 Hrs |
|---|---|---|---|---|
| Resin A | 40 | Wollastonite (1:1) | 12.2 | 13.3 |
| Resin A | 40 | Wollastonite (2:1) | 10.3 | 12.9 |
| Resin A | 30 | Fibrous Chopped glass (2:1) | 25.5 | 29.9 |

The use of fibrous chopped glass as filler in the alkaline novolak solution gives a dramatic rise in the punch shear strength.

NOTE: The punch shear strength S(MPa) is defined (British Standard 2782:Part3:1978 Test Method 240A) as follows:

$$S = \frac{F}{\pi DT}$$

where F is force (N)
where D is a diameter of punch (6.35 mm)
T is mean thickness of test piece (mm)

Example 12

A resin-containing mixture was prepared of the following components:
100 g oxalic acid-catalyzed phenol-formaldehyde novolak resin (P:F =1:0.5)
100 g 2,4,6-tris(acetoxymethyl) phenol acetate
20 g ethylene glycol
20 g phenoxyethanol
0.5 g gamma-aminopropyl triethoxysilane.

The mixture was a medium viscosity mobile liquid. The gel time of this mixture in the absence of and in the presence of water was determined at 20° C. using calcium oxide as base. The results are set out below.

| Resin mixture | 10 g | 10 g |

| | | |
|---|---|---|
| CaO | 1.3 g | 1.3 g |
| Water | 0 | 0.9 g |
| Gel time: | no gel after 20 minutes | strong exotherm gels after 2 minutes |

Example 13

A resin-containing mixture was prepared of the following components:
50 g oxalic acid-catalyzed phenol-formaldehyde novolak resin (P:F =1:0.5)
50 g 2,4,6-tris (acetoxymethyl) phenol
15 g ethylene glycol
10 g phenoxyethanol
0.5 g gamma-aminopropyl triethoxysilane The mixture was a low viscosity mobile liquid.

The gel time of this mixture in the absence of and in the presence of water was determined at 20 using calcium oxide as base. The results are set out below.

| | | |
|---|---|---|
| Resin mixture | 10 g | 10 g |
| CaO | 1.1 g | 1.1 g |
| Water | 0 | 0.9 g |
| Gel time: | no reaction after 1 hour | gelation occurred after 2½ minutes |

Example 14

About 1000 g of Chelford sand were mixed with 20 g of the resin mixture prepared in Example 12 and 4 g of dry calcium oxide (Analar grade, BDH) in a laboratory mixer until thoroughly dispersed. The resulting mixture was then discharged into an open tray.

About 100 g of this mixture were rammed (three times) in a standard 2 inch diameter polished metal cylindrical corebox. One core was carefully removed from the box and set aside. Further cores were then prepared and retained in the box. Steam was then passed through the core box from the bottom, assisted by the application of vacuum to the top, for a period of 10 seconds. After this time, the steam treated cores were strong enough to be stripped from the core box and handled. They were then placed in a cabinet at 50% humidity for 3 hours and then crushed in a Hounsfield tensiometer to determine core strength. The average core strength of the steam treated cores was 1100 $kN/m^2$. The core strength of the untreated core was determined (by the same method) to be approximately 300 $kN/m^2$. The experiment was repeated except that 20 g of the resin mixture prepared in Example 13 were used. The average core strength of the steam treated cores was 1390 $kN/m^2$ whereas the core strength of the untreated core was approximately 300 $kN/m^2$.

Example 1

The following resin solutions were prepared:

| Solution A (novolak-containing solution) | |
|---|---|
| trimethyol phenol triacetate | 50 g |
| phenol-formaldehyde novolak resin | 50 g |
| phenoxyethanol | 10 g |
| ethylene glycol | 15 g |
| gamma-aminopropyl triethoxysilane | 0.5 g |

The novolak resin was an unneutralized, oxalic acid catalyzed novolak resin having a phenol: formaldehyde mol ratio of 1:0.5 (prepared from 2619.2 g 100% phenol, 61.6 g oxalic acid, 184.8 g water and 835.9 g 50% formalin) which was steam distilled to reduce the free phenol content to below 2%.

| Solution B (resole formate solution) | |
|---|---|
| resole formate | 70 g |
| phenoxyethanol | 15 g |
| ethylene glycol | 10 g |

The resole formate is "Product No. 2.3" ( see "Experimental" section)

About 10 g of solution A, 0.1 g of solution B and 2 g CaO were mixed with 600 g Chelford 50 sand. From this mixture, 4×100 g cores were prepared.

Air was sucked by vacuum pump through water heated to 60° C. immediately before being drawn through two of the sand cores. The warm air/moisture was passed for 1 minute and 5 minutes, respectively. The strengths achieved after standing for 3 hours were as follows:

1 minute vapor treated: 920 $kNm^{-2}$
5 minutes vapor treated: 1000 $kNm^{-2}$
untreated 250 and 100 $kNm^{-2}$

Example 16

Two phenol-formaldehyde novolak resin compositions were made up as follows:

| | Composition A (% by weight) | Composition B (% by weight) |
|---|---|---|
| phenol-formaldehyde novolak resin | 43.2 | 42.7 |
| 50% aqueous NaOH | — | 24.7 |
| 50% aqueous KOH | 34.6 | — |
| ethylene glycol | 8.8 | 8.8 |
| water | 12.0 | 22.4 |
| 40% aqueous sodium ethylhexylsulphate | 1.0 | 1.0 |
| gamma-aminopropyl triethoxysilane | 0.4 | 0.4 |

The phenol-formaldehyde novolak had a P:F molar ratio of 1:0.6, was $H_2SO_4$/salicylic acid -catalyzed and was steam stripped to a free phenol content of <2%.

Each of compositions A and B was assessed as a binder for sand in the production of foundry cores. Thus, an amount of new virgin Redhill 50 AFS sand was mixed with 1.56% by weight (based on the weight of the sand) of the binder composition in a standard core mixer for a short time. Into the sand/binder mixture was then mixed a preblend of 0.6% by weight (based on the weight of sand) of 2,4,6-tris(acetoxymethyl)-phenol acetate and 0.15% (based on the weight of sand) of solvent comprising 50% by weight ethylene glycol and 50% by weight phenoxyethanol. The sand/binder/ester mixture was immediately discharged and core samples were made. The bench life, strip time, Scratch hardness and flexural strength of cores for each binder composition were determined and the results are set out below in Table 12.

The figures for Scratch hardness in this Example were obtained using a Ridsdale Dieteft Core Hardness Tester which is a standard piece of equipment used conventionally to determine accurately the surface hardness of cores. In general, what happens is that the surface of the core is subjected to controlled abrasion by a rotatable penetrator and the depth of penetration, in thousands of an inch, is measured on a horizontally mounted dial gauge. The tester was used as follows:
1) Calibration: the tester was pressed against a very a hard flat surface (not sample to be tested) and the dial reading, if not at 100, was adjusted to 100;
2) the tester was then pressed against a flat portion of a sample core to be tested, left for 5 seconds and the dial reading taken;
3) the penetrator was then rotated through one revolution and the dial reading taken;
4) the two readings recorded are, therefore,
   (a) penetration without rotation and
   (b) penetration after rotating once and the figures expressed as (a)/(b); the higher the figures, the harder the core.

TABLE 12

| Sand mix | Bench Life (mins) | Strip time (mins) | Scratch hardness ½ h. | 1 h. | 2 h. | Flexural Strength (kg/cm$^2$) ½ h. | 1 h. | 2 h. |
|---|---|---|---|---|---|---|---|---|
| with binder A | 4 | 8 | 94/85 | 97/88 | 97/91 | 28.8 | 34.6 | 39.6 |
| with binder B | 6 | 11 | 82/68 | 90/79 | 95/82 | 14.4 | 22.3 | 30.2 |

These results demonstrate the high strengths that may be obtained by the present invention.

I claim:
1. A phenolic resin composition comprising
   (1) an esterified phenolic compound containing one or more phenolic hydroxyl groups and/or one or more esterified phenolic hydroxyl groups and containing one or more esterified methylol groups positioned ortho and/or para to a phenolic hydroxyl group or esterified phenolic hydroxyl group,
   (2) an unesterified phenolic novolak resin, and
   (3) a sufficient quantity of a base to render alkaline a mixture of all three components (1), (2) and (3), in the presence of water;
wherein said one or more esterified methylol groups of (1) contain ester functionalities generated from a functionality selected from the group consisting of formate, acetate, acetoacetate, acrylate, propionate, lactate, crotonate, methacrylate, butyrate, isobutyrate, caproate, caprylate, benzoate, toluate, p-amino-benozate, p-hydroxybenzoate, salicylate, cinnamate, laurate, myristate, palmitate, oleate, ricinoleate, stearate, oxalate, succinate, fumarate, adipate, phthalate, azelate, sebacate, and mixtures thereof, and
wherein said resin in said mixture is curable in an alkaline condition of said mixture in the presence of a polar liquid.

2. The composition of claim 1, wherein said polar liquid is present and comprises water.

3. The composition of claim 1, wherein said polar liquid is present and comprises a glycol.

4. The composition of claim 1, wherein said esterified phenolic compound contains no free phenolic hydroxyl groups but only one or more esterified phenolic hydroxyl groups in addition to the one or more esterified methylol groups positioned ortho and/or para to said esterified phenolic hydroxyl group(s).

5. The composition of claim 2, wherein said alkaline condition is reflected in a pH above 7.

6. The composition of claim 3, wherein said glycol comprises an ethylene glycol.

7. The composition of claim 5, wherein said base is selected from the group consisting of an alkali metal, alkaline earth metal, oxide thereof, hydroxide thereof, and mixtures thereof.

8. The composition of claim 1, wherein said esterified phenolic compound comprises an esterified phenol-formaldehyde resole resin containing a plurality of esterified methylol groups.

9. The composition of claim 7, wherein said base is selected from the group consisting of oxides and hydroxides of potassium, sodium, lithium, calcium, magnesium, and mixtures thereof.

10. A phenolic resin composition comprising
    (1) an esterified phenolic compound containing one or more phenolic hydroxyl groups and/or one or more esterified phenolic hydroxyl groups and containing one or more esterified methylol groups positioned ortho and/or para to a phenolic hydroxyl group or esterified phenolic hydroxyl group,
    (2) an unesterified phenolic novolak resin, and
    (3) a sufficient quantity of a base to render alkaline a mixture of all three components (1), (2) and (3), in the presence of water:
wherein said resin in said mixture is curable in an alkaline condition of said mixture in the presence of a polar liquid and
wherein said esterified phenolic compound is selected from the group consisting of 2,4,6-trimethylolpenol tetraacetate, 2,6-dimethylol-p-cresol triacetate, 2,6-dimethylolphenol triacetate and 2,2',6,6'-tetramethylol-Bisphenol A hexaacetate.

11. The composition of claim 1, wherein said novolak resin comprises an aqueous alkaline solution of said novolak.

12. The composition of claim 1, wherein said novolak resin comprises a solution of said resin in aqueous potassium hydroxide and one or more polar liquids selected from the group consisting of glycols, ether alcohols, and keto alcohols.

13. The composition of claim 10 wherein said novolak resin comprises a solution of said resin in aqueous potassium hydroxide and one or more polar liquids selected from the group consisting of glycols, ether alcohols, and keto alcohols and wherein said esterified phenolic compound comprises 2,4,6-trimethylol phenol tetraacetate.

14. The composition of claim 1, wherein said mixture is anhydrous and further comprising, in said mixture, anhydrous base.

15. The composition of claim 10, wherein said mixture is anhydrous and further comprising, in said mixture, anhydrous base and wherein said esterified phenolic compound comprises 2,4,6-trimethylol phenol tetraacetate and said anhydrous base comprises anhydrous calcium oxide.

16. The composition of claim 15, wherein said resin is curable at ambient temperature upon the addition of sufficient moisture to convert said composition to an alkaline condition.

17. A phenolic resin composition comprising a mixture of
   (1) 2,4,6-tri(acetoxymethyl)phenol acetate, and
   (2) a phenolic novolak resin comprising 2,6-bis(o-hydroxy benzyl)phenol,
   (3) a sufficient quantity of a base to render alkaline a mixture of components (1), (2) and (3) in the presence of water,
said resin in said mixture being curable in an alkaline condition in the presence of a polar liquid.

18. A phenolic resin composition comprising a mixture of
   (1) 2,4,6-tri(acetoxymethyl)phenol acetate, and
   (2) a phenolic novolak resin comprising 2,6-bis(O-hydroxy benzyl)phenol,
   (3) a sufficient quantity of a base to render alkaline a mixture of components (1), (2) and (3) in the presence of water.
said resin in said mixture being curable in an alkaline condition in the presence of a polar liquid wherein said resin in said mixture is curable at room temperature in the presence of a mixture of polar liquids comprising ethylene glycol and phenoxyethanol.

19. A phenolic resin composition of ingredients that upon admixture are curable at ambient temperature comprising:
   (1) an esterified phenol-formaldehyde resole resin containing one or more phenolic hydroxy groups and/or one or more esterified phenolic hydroxyl groups and containing one or more esterified methylol groups positioned ortho and/or para to a phenolic hydroxyl group or esterified phenolic hydroxyl group,
   (2) an unesterified phenolic novolak resin, and
   (3) a sufficient quantity of a base to render said composition alkaline and curable;
wherein the one or more esterified methylol groups of (1) contain ester functionalities generated from a functionality selected from the group consisting of formate, acetate, acetoacetate, acrylate, propionate, lactate, crotonate, methacrylate, butyrate, isobutyrate, caproate, caprylate, benzoate, toluate, p-amino-benzoate, p-hydroxybenzoate, salicylate, cinnamate, laurate, myristate, palmitate, oleate, ricinoleate, stearate, oxalate, succinate, fumarate, adipate, phthalate, azelate, sebacate, and mixtures thereof.

20. The composition of claim 19, wherein said esterified phenolic compound contains one or more esterified phenolic hydroxyl groups and one or more esterified methylol groups positioned ortho and/or para to an esterified phenolic hydroxyl group and contains no free phenolic hydroxyl groups.

21. The composition of claim 19, wherein said base is selected from the group consisting of oxides and hydroxides of potassium, sodium, lithium, calcium and magnesium.

22. The composition of claim 19, wherein said polar liquid solvent is selected from the group consisting of glycols, ether alcohols, keto alcohols and mixtures thereof.

23. The composition of claim 19 wherein said polar liquid comprises one or more members of the groups consisting of diacetone alcohol, ethyl digol, ethoxyethanol, phenoxyethanol, ethylene glycol, triethanolamine, diethylene glycol and dimethylacetamide.

24. The composition of claim 23, wherein said polar liquid comprises a mixture of ethylene glycol and phenoxyethanol.

25. The composition of claim 23, wherein said polar liquid is present in an amount of from 1% to 50% by weight based on the weight of said phenolic novolak resin.

26. The composition of claim 19, wherein said phenolic novolak resin has a free phenol content of less than 2%.

27. A phenolic resin composition of ingredients that upon admixture are curable at ambient temperature comprising:
   (1) an esterified phenol-formaldehyde resole resin containing one or more phenolic hydroxyl groups and/or one or more esterified phenolic hydroxy groups and containing one or more esterified methylol groups positioned ortho and/or para to a phenolic hydroxyl group or esterified phenolic hydroxyl group,
   (2) an unesterified phenolic novolak resin, and
   (3) a sufficient quantity of a base to render said composition alkaline and curable in the presence of water and/or other polar liquid
wherein said phenolic novolak resin has a free phenol content of less than 2% and
wherein said esterified phenolic compound is selected from the group consisting of 2,4,6-trimethylolphenol tetraacetate, 2,6-dimethylol-p-cresol triacetate, 2,6-dimethylolphenol triacetate and 2,2',6,6'-tetramethylol-Bisphenol A hexaacetate.

28. A phenolic resin composition of ingredients that upon admixture are curable at ambient temperature comprising:
   (1) an esterified phenol-formaldehyde resole resin containing one or more phenolic hydroxyl groups and/or one or more esterified phenolic hydroxyl groups and containing one or more esterified methylol groups positioned ortho and/or para to a phenolic hydroxyl group or esterified phenolic hydroxyl group, or more esterified methylol groups positioned ortho and/or para to a phenolic hydroxyl group or esterified phenolic hydroxyl group,
   (2) an unesterified phenolic novolak resin, and
   (3) a sufficient quantity of a base to render said composition alkaline and curable;
wherein the one or more esterified methylol groups of (1) contain ester functionalities generated from a functionality selected from the group consisting of formate, acetate, acetoacetate, acrylate, propionate, lactate, crotonate, methacrylate, butyrate, isobutyrate, caproate, caprylate, benzoate, toluate, p-amino-benzoate, p-hydroxybenzoate, salicylate, cinnamate, laurate, myristate, palmitate, oleate, ricinoleate, stearate, oxalate, succinate, fumarate, adipate, phthalate, azelate, sebacate, and mixtures thereof and wherein said base is selected from the oxides and hydroxides of potassium, sodium, lithium, calcium and magnesium.

29. The composition of claim 28, wherein said polar liquid is selected from the group consisting of glycols, ether alcohols, keto alcohols and mixtures thereof.

30. A phenolic resin composition comprising a mixture of
   (1) an esterified phenolic compound containing one or more phenolic hydroxyl groups and/or one or more esterified phenolic hydroxyl groups and containing one or more esterified methylol group positioned ortho and/or para to a phenolic hydroxyl group of esterified phenol hydroxyl group, and
   (2) an unesterified phenolic novolak resin, and (3) a base;
wherein the one or more esterified methylol groups of (1) contain ester functionalities generated from a functionality selected from the group consisting of formate, acetate, acetoacetate, acrylate, propionate, lactate, crotonate, methacrylate, butyrate, isobutyrate, caproate, caprylate, benzoate, toluate, p-amino-benzoate, p-hydroxybenzoate, salicylate, cinnamate, laurate, myristate, palmitate, oleate, ricinoleate, stearate, oxalate, succinate, fumarate, adipate, phthalate, azelate, sebacate, and mixtures thereof, and
wherein said mixture undergoes reaction in an alkaline condition of said mixture upon saponification of said esterified compound and in the presence of a polar solvent, to produce a cured phenolic resin composition.

31. The composition of claim 30, wherein said phenolic compound comprises a phenolic resole resin.

32. The composition of claim 30, wherein said esterified phenolic compound is mononuclear phenol having an aromatic ring to which is attached to least one phenolic hydroxyl group, or an ester thereof containing at least one esterified phenolic hydroxyl group which further contains one or more esterified methylol groups attached to the aromatic ring at a position ortho and/or para to phenolic hydroxyl group or esterified phenolic hydroxyl group.

33. The composition of claim 30, wherein said esterified phenolic compound is selected from the group consisting of esterified methylol-substituted phenol, o-cresol, m-cresol, p-cresol, 3,5-xylen-1-ol, resorcinol, phloroglucinol, Bisphenol-A, pyrogallol and mixtures thereof, and esters of these wherein the phenolic hydroxyl group or at least one of phenolic hydroxyl groups is esterified.

34. A phenolic resin composition comprising a mixture of
(1) an esterified phenolic compound containing one or more phenolic hydroxyl groups and/or one or more esterified phenolic hydroxyl groups and containing one or more esterified methylol groups positioned ortho and/or para to a phenolic hydroxyl group or esterified phenol hydroxyl group, and
(2) an unesterified phenolic novolak resin, and
(3) a base;
wherein said mixture undergoes reaction in an alkaline condition of said mixture upon saponification of said esterified compound and in the presence of a polar solvent, to produce a cured phenolic resin composition, wherein said esterified phenolic compound is selected from the group consisting of 2-acetyloxymethyl phenol, 2-methacryloyloxymethyl phenol, 2-salicyloyloxymethyl phenol, 2-acetyloxymethyl phenol acetate, 2,6-diacetyloxymethyl p-cresol, 2,6-diacetyloxymethyl p-cresol acetate, 2,6-diacetoactyloxymethyl p-cresol, 2,4,6-triacetyloxymethyl phenol acetate, 2,6-diacetyloxymethyl phenol acetate, 2,2',6,6'-tetraacetyloxymethyl Bisphenol A, and 2,2',6,6'-tetraacetyloxymethyl Bisphenol A diacetate.

35. The composition of claim 30, wherein said esterified phenolic compound comprises an esterified methylol group-containing derivative of a condensation reaction product obtained by reacting a mononuclear phenol with a phenol-reactive aldehyde or ketone, using a molar excess of said aldehydes or ketone in the presence of a basic catalyst, wherein the said derivative contains one or more phenolic hydroxyl groups and/or one or more esterified methylol groups positioned ortho and/or para to a phenolic hydroxyl group or esterified phenolic group.

36. The composition of claim 35, wherein said esterified phenolic compound comprises an esterified methylol group-containing derivative of a condensation reaction product obtained by reacting formaldehyde and a mononuclear phenol, using a molar excess of said formaldehyde in the presence of a basic catalyst, wherein said phenol is selected from the group consisting of phenol, o-, m-, or p-cresol, 3,5-xylen-1-ol, resorcinol, phloroglucinol, pyrogallol and mixtures thereof, wherein the said derivative contains one or more phenolic hydroxyl groups and/or one or more esterified phenolic hydroxyl groups positioned ortho and/or para to a phenolic hydroxyl group or esterified phenolic hydroxyl group.

37. The composition of claim 36, wherein said esterified phenolic compound comprises an esterified or partially esterified phenol-formaldehyde resole resin.

38. A phenolic resin composition comprising a mixture of
(1) an esterified phenolic compound containing one or more phenolic hydroxyl groups and/or one or more esterified phenolic hydroxyl groups and containing one of more esterified methylol groups positioned ortho and/or para to a phenolic hydroxyl group or esterified phenol hydroxyl group, and
(2) an unesterified phenolic novolak resin, and
(3) a base;
wherein the one or more esterified methylol groups of (1) contain ester functionalities generated from a functionality selected from the group consisting of formate, acetate, acetoacetate, acrylate, propionate, lactate, crotonate, methacrylate, butyrate, isobutyrate, caproate, caprylate, benzoate, toluate, p-amino-benzoate, p-hydroxybenzoate, salicylate, cinnamate, laurate, myristate, palmitate, oleate, ricinoleate, stearate, oxalate, succinate, fumarate, adipate, phthalate, azelate, sebacate, and mixtures thereof, and
wherein said mixture undergoes reaction in an alkaline condition of said mixture upon saponification of said esterified compound and in the presence of a polar solvent, to produce a cured phenolic resin composition, and wherein said esterified phenolic compound contains one or more acetyloxymethyl groups or formyloxymethyl groups positioned ortho and/or para to a phenolic hydroxyl group or esterified phenolic hydroxyl group.

39. A composition of claim 30, wherein said base is an alkali selected from the group consisting of oxides and hydroxides of lithium, sodium, potassium, calcium and magnesium.

40. A method for making a cured phenolic resin composition comprising reacting a mixture of
(1) an esterified phenolic compound containing one or more phenolic hydroxyl groups and/or one or more esterified methylol groups positioned ortho and/or para to a phenolic hydroxyl group or esterified phenolic hydroxyl group,
(2) an unesterified phenolic novolac resin, and
(3) a base, sufficient to adjust said mixture to a basic condition,
wherein the one or more esterified methylol groups of (1) contain ester functionalities generated from a functionality selected from the group consisting of formate, acetate, acetoacetate, acrylate, propionate, lactate, crotonate, methacrylate, butyrate, isobutyrate, caproate, caprylate, benzoate, toluate, p-amino-benzoate, p-hydroxybenzoate, salicylate, cinnamate, laurate, myristate, palmitate, oleate, ricinoleate, stearate, oxalate, succinate, fumarate, adipate, phthalate, azelate, sebacate, and mixtures thereof, and
wherein said resin in said mixture is curable in an alkaline condition of said mixture and in the presence of a polar liquid.

41. The method of claim 40, wherein said esterified phenolic compound comprises an esterified phenol-formaldehyde resole resin containing a plurality of esterified methylol groups.

42. The method of claim 40, wherein said esterified phenolic compound contains one or more esterified phenolic hydroxyl groups and one or more esterified methylol groups positioned ortho and/or para to an esterified phenolic hydroxyl group and contains no free phenolic hydroxyl groups.

43. A method for making a cured phenolic resin composition comprising reacting a mixture of
    (1) an esterified phenolic compound containing one or more phenolic hydroxyl groups and/or one or more esterified methylol groups positioned ortho and/or para to a phenolic hydroxyl group or esterified phenol hydroxyl group.
    (2) an unesterified phenolic novolak resin, and
    (3) a base, sufficient to adjust said mixture to a basic condition,
wherein said resin in said mixture being curable in an alkaline condition of said mixture and in the presence of a polar liquid and wherein said esterified phenolic compound is selected from the group consisting of 2,4,6-trimethylolphenol tetraacetate, 2,6-dimethylol-p-cresol triacetate, 2,6-dimethylolphenol triacetate and 2,2',6,6'-tetramethylol-Bisphenol A hexaacetate.

44. The method of claim 40, wherein said phenolic novolak resin has a free phenol content of less than 2%.

45. The method of claim 40, wherein said base is selected from the group consisting of oxides and hydroxides of potassium, sodium, lithium, calcium, magnesium, and mixtures thereof.

46. The method of claim 45, wherein said polar liquid comprises water and said quantity of base in the presence of said water is sufficient to adjust the pH of said mixture above 7.

47. The method of claim 40, wherein said polar liquid is selected from the group consisting of glycols, ether alcohols, keto alcohols and mixtures thereof.

48. The method of claim 47, wherein said polar liquid comprises one or more members of the group consisting of diacetone alcohol, ethyl digol, ethoxyethanol, phenoxyethanol, ethylene glycol, triethanolamine, diethylene glycol and dimethylacetamide.

49. The method of claim 48, wherein said polar liquid comprises a mixture of ethylene glycol and phenoxyethanol.

50. The method of claim 47, wherein said polar liquid is present in an amount of from 1% to 50% by weight based on the weight of said phenolic novolak resin.

51. The method of claim 40, wherein said esterified phenolic compound is present in an amount of from 10% to 120% by weight based on the weight of said phenolic novolak resin.

52. The method of claim 40, wherein said esterified phenolic compound is a mononuclear phenol having an aromatic ring to which is attached at least one phenolic hydroxyl group, or an ester thereof containing at least one esterified phenolic hydroxyl group which further contains one or more esterified methylol groups attached to aromatic ring at a position ortho and/or para to a phenolic hydroxyl group or esterified phenolic hydroxyl group.

53. The method of claim 52, wherein said esterified phenolic compound is selected from the consisting of esterified methylol-substituted phenol, o-cresol, m-cresol, p-cresol, 2,5-xylen-1-ol, resorcinol, phloroglucinol, Bisphenol A, pyrogallol and mixtures thereof, and esters of these wherein the phenolic hydroxyl group or at least one of the phenolic hydroxyl groups is esterified.

54. A method for making a cured phenolic resin composition comprising reacting a mixture of
    (1) an esterified phenolic compound containing one or more phenolic hydroxyl groups and/or one or more esterified methylol groups positioned ortho and/or para to a phenolic hydroxyl group or esterified phenol hydroxyl group.
    (2) an unesterified phenolic novolak resin, and
    (3) a base, sufficient to adjust said mixture to a basic condition.
said resin in said mixture is curable in an alkaline condition of said mixture and in the presence of a polar liquid wherein said esterified phenolic compound is selected from the group consisting of 2-acetyloxymethyl phenol, 2-methacryloyloxymethyl phenol, 2-salicyloyloxymethyl phenol, 2-acetyloxymethyl phenol acetate, 2,6-diacetyloxymethyl p-cresol, 2,6-diacetyloxymethyl p-cresol acetate, 2,4,6-triacetyloxymethyl phenol, 2,4,6-triacetyloxymethyl phenol acetate, 2,6-diacetyloxymethyl phenol acetate, 2,2',6,6'-tetraacetyloxymethyl Bisphenol A, and 2,2',6,6'-tetraacetyloxymethyl Bisphenol A diacetate.

55. The method of claim 40, wherein said esterified phenolic compound comprises an esterified methylol group-containing derivative of a condensation reaction product obtained by reacting a mononuclear phenol with a phenol-reactive aldehyde or ketone using a molar excess of said aldehyde or ketone in the presence of a basic catalyst, wherein the said derivative contains one or more phenolic hydroxy groups and/or one or more esterified methylol groups positioned ortho and/or para to a phenolic hydroxyl group or esterified phenolic group.

56. The method of claim 55, wherein said esterified phenolic compound comprises and esterified methylol group-containing derivative of a condensation reaction product obtained by reacting formaldehyde and a mononuclear phenol using a molar excess of said formaldehyde in the presence of a basic catalyst, wherein said phenol is selected from the group consisting of phenol, o-, m-, or p-cresol, 2,5-xylen-ol, resorcinol, phloroglucinol, pyrogallol and mixtures thereof, wherein the said derivative contains one or more phenolic hydroxyl groups and/or one or more esterified phenolic hydroxyl groups and contains one or more esterified methylol groups positioned ortho and/or para to a phenolic hydroxyl group or esterified phenolic hydroxyl group.

57. The method of claim 56, wherein said esterified phenolic compound is an esterified or partially esterified phenol-formaldehyde resole resin.

58. A method for making a cured phenolic resin composition comprising reacting a mixture of
    (1) an esterified phenolic compound containing one or more phenolic hydroxyl groups and/or one or more esterified methylol groups positioned ortho and/or para to a phenolic hydroxyl group or esterified phenol hydroxyl group, (2) an unesterified phenolic novolak resin, and (3) a base, sufficient to adjust said mixture to a basic condition, wherein said resin in said mixture is curable in an alkaline condition of said mixture and in the presence of a polar liquid wherein said esterified phenolic compound is selected from the group consisting of 2-acetyloxymethyl phenol, 2-methacryloyloxymethyl phenol, 2-salicyloyloxymethyl phenol, 2-acetyloxymethyl phenol acetate, 2,6-diacetyloxymethyl p-cresol, 2,6-diacetyloxymethyl p-cresol acetate, 2,4,6-triacetyloxymethyl phenol, 2,4,6-triacetyloxymethyl phenol acetate, 2,6-diacetyloxymethyl phenol acetate, 2,2',6,6'-tetraacetyloxymethyl Bisphenol A, and 2,2',6,6'-tetraacetyloxymethyl Bisphenol A diacetate, wherein said esterified phenolic compound comprises an esterified methylol group-containing derivative of a condensation reaction product obtained by reacting formaldehyde and a mononuclear phenol using a molar excess of said formaldehyde is the presence of a basic catalyst, wherein said phenol is selected from the group consisting of phenol, o-, m-, or p-cresol, 2,5-xylen-ol, resorcinol, phloroglucinol, pyrogallol and mixtures thereof, wherein the said derivative contains one or more phenolic hydroxyl groups and/or one or more esterified phenolic hydroxyl groups positioned ortho and/or para to a phenolic hydroxyl group or esterified phenolic hydroxyl group, wherein said esterified phenolic compound is an esterified or partially esterified phenol-formaldehyde resole resin and wherein said esterified phenolic compound contains one or more acetyloxymethyl groups or formyloxyethyl groups positioned ortho and/or para to a phenolic hydroxyl group or esterified phenolic hydroxyl group.

59. The method of claim 40, wherein said base in an alkali selected from the oxides and hydroxides of lithium, sodium, potassium, calcium and magnesium.

60. The composition of claim 1, wherein additionally contains a blowing or foaming agent.

61. The composition of claim 19, which additionally contains a blowing or foaming agent.

62. A foundry moulding composition comprising a mixture of a major amount of granular refractory material and a minor amount effective to bind the granular refractory material of a phenolic resin composition of claim 1.

63. A foundry moulding composition comprising a mixture of major amount of granular refractory material and a minor amount effective to bind the granular refractory material of a phenolic resin composition of claim 19.

64. A composition of claim 1 which additionally contains a silane coupling agent.

* * * * *